(12) United States Patent
Ajitomi et al.

(10) Patent No.: US 10,187,284 B2
(45) Date of Patent: Jan. 22, 2019

(54) COMMUNICATION DEVICE, SERVER DEVICE, COMMUNICATION METHOD, AND NON-TRANSITORY COMPUTER READABLE MEDIUM

(71) Applicant: KABUSHIKI KAISHA TOSHIBA, Tokyo (JP)

(72) Inventors: Daisuke Ajitomi, Tokyo (JP); Keisuke Minami, Kanagawa (JP); Hiroshi Kawazoe, Kanagawa (JP); Hiroyuki Aizu, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 303 days.

(21) Appl. No.: 14/757,504

(22) Filed: Dec. 23, 2015

(65) Prior Publication Data
US 2016/0191364 A1 Jun. 30, 2016

(30) Foreign Application Priority Data
Dec. 24, 2014 (JP) .................. 2014-261275

(51) Int. Cl.
*H04L 12/26* (2006.01)
*H04L 12/801* (2013.01)
(Continued)

(52) U.S. Cl.
CPC .......... *H04L 43/10* (2013.01); *H04L 43/0811* (2013.01); *H04L 47/16* (2013.01); *H04L 47/28* (2013.01); *H04L 63/08* (2013.01)

(58) Field of Classification Search
CPC ..... H04L 43/10; H04L 43/50; H04L 43/0811; H04L 47/16; H04L 47/28; H04L 63/08
See application file for complete search history.

(56) References Cited

U.S. PATENT DOCUMENTS 9,647,919 B1* 5/2017 Arguelles ............ H04L 43/0888
2004/0081101 A1* 4/2004 Bennett ............... H04L 41/5009
370/252
(Continued)

FOREIGN PATENT DOCUMENTS

JP 2014-053732 3/2014
JP 2014-199998 10/2014
(Continued)

OTHER PUBLICATIONS

E. Katz-Bassett, Reverse Traceroute, 2010, USENIX Symposium on Network ed Systems Design & Implementation (NSDI), 2010., "http://research.cs.washington.edu/networking/astronomy/reverse-traceroute.html", p. 1-16.*
(Continued)

*Primary Examiner* — Wing F Chan
*Assistant Examiner* — Billy H Ng
(74) *Attorney, Agent, or Firm* — Nixon & Vanderhye, P.C.

(57) ABSTRACT

A communication device includes a computer including a processor. The computer controls the communication device to perform operations. The operations include establishing a first connection with a first external device and establishing a second connection with a second external device, via a communication network. The operations include transmitting a keep-alive packet to the first external device via the first connection at a first transmission cycle and receiving a response packet for the keep-alive packet. The operations include determining the first transmission cycle according to transmission cycle determination processing which transmits a measurement packet to the first external device via the first connection at a candidate time interval after the second connection is established or after another measurement packet is received via the second connection, and confirming (Continued)

whether the measurement packet transferred by the first external device to the second external device is received via the second connection.

17 Claims, 15 Drawing Sheets

(51) Int. Cl.
*H04L 12/841* (2013.01)
*H04L 29/06* (2006.01)

(56) References Cited

U.S. PATENT DOCUMENTS

| | | | | |
|---|---|---|---|---|
| 2006/0251256 | A1* | 11/2006 | Asokan | H04L 63/065 380/270 |
| 2007/0133422 | A1* | 6/2007 | Su | H04L 12/2697 370/248 |
| 2008/0181123 | A1* | 7/2008 | Huang | H04L 41/5009 370/252 |
| 2008/0205292 | A1* | 8/2008 | Denby | H04L 43/0829 370/254 |
| 2011/0013511 | A1* | 1/2011 | Li | H04L 47/11 370/231 |
| 2013/0272146 | A1* | 10/2013 | Jones | H04L 43/50 370/252 |
| 2014/0297878 | A1 | 10/2014 | Minami et al. | |
| 2015/0256622 | A1 | 9/2015 | Kawazoe et al. | |
| 2015/0256626 | A1 | 9/2015 | Ajitomi et al. | |
| 2016/0014213 | A1 | 1/2016 | Ajitomi et al. | |
| 2016/0087907 | A1 | 3/2016 | Ajitomi et al. | |
| 2016/0117213 | A1* | 4/2016 | Arjun | G06F 11/0757 714/55 |
| 2016/0165463 | A1* | 6/2016 | Zhang | H04L 43/10 370/218 |

FOREIGN PATENT DOCUMENTS

| | | |
|---|---|---|
| JP | 2015-170041 | 9/2015 |
| JP | 2015-170286 | 9/2015 |
| JP | 2016-019179 | 2/2016 |
| JP | 2016063425 | 4/2016 |

OTHER PUBLICATIONS

Ajitomi, U.S. Appl. No. 14/849,996, filed Sep. 10, 2015.

* cited by examiner

COMMUNICATION DEVICE, SERVER DEVICE, COMMUNICATION METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2014-261275, filed Dec. 24, 2014; the entire contents of which are incorporated herein by reference.

FIELD

Embodiments described herein relate to a communication device, a server device, a communication method, and a non-transitory computer readable medium.

BACKGROUND

WebSocket is known as a Web standard communications protocol that keeps an established communication connection and implements a two-way low delay communication. Additionally, similar protocols assuming a permanent connection include MQTT (Message Queue Telemetry Transport) that implements one-to-one or one-to-many communications among devices. In these communication protocols, it is required to periodically transmit keep-alive packets to keep the connection so as not to disconnect a communication connection due to a relay device on a communication route. This is because if a no-communication state, in which no packets flow at all, continues for a certain amount of time, an interposed relay device may disconnect the communication connection.

A timeout value, which is a time until which a relay device disconnects a connection, differs according to the model or the setting of the relay device, and it is often the case where communication equipment cannot refer to this set value. For this reason, keep-alive packets are typically transmitted at a cycle of a value (e.g., 60 seconds), which is assumed to be less than a timeout set value of the relay device.

However, in the case of connecting with a large number of clients, a communication cost, and a load on communication equipment and a server communicating thereto (a load on CPU or the like) cannot be ignored in a scheme in which keep-alive packets are transmitted uniformly at a short cycle. In particular, as to cloud computing services that have been in widespread use, communications are often subject to usage based rates and an increase of traffic influences on an operation cost, and thus it is required to reduce the traffic as much as possible.

DETAILED DESCRIPTION

Figure 1:
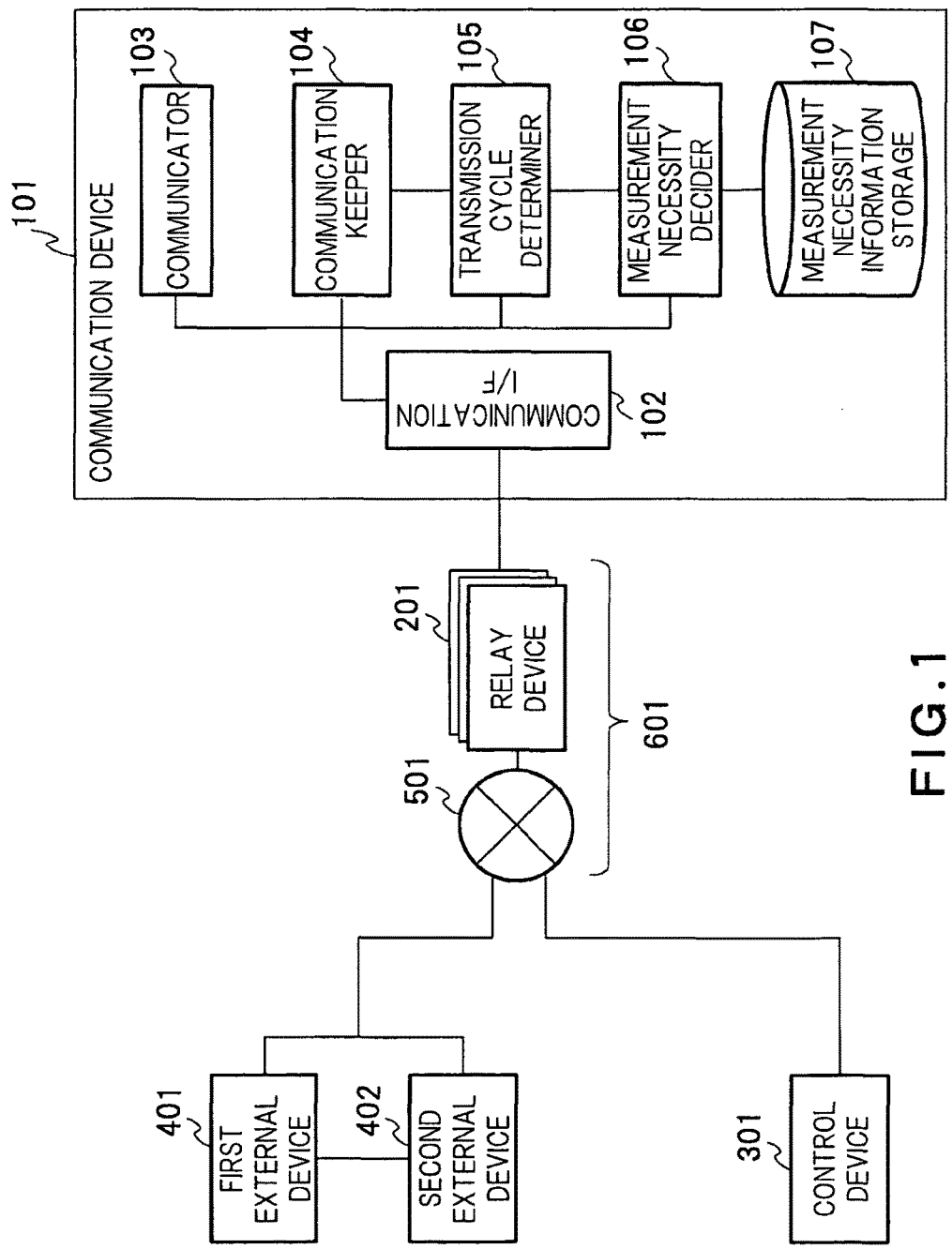
FIG. 1 is a block diagram showing the outline configuration of a communicating system in a first embodiment.

According to one embodiment, a communication device includes a computer including a processor. The computer controls the communication device to perform operations. The operations include establishing a first connection with a first external device and establishing a second connection with a second external device, via a communication network. The operations include transmitting a keep-alive packet to the first external device via the first connection at a first transmission cycle and receiving a response packet for the keep-alive packet. The operations include determining the first transmission cycle according to transmission cycle determination processing which transmits a measurement packet to the first external device via the first connection at a candidate time interval after the second connection is established or after another measurement packet is received via the second connection, and confirming whether the measurement packet transferred by the first external device to the second external device is received via the second connection.

Embodiments will be described below with reference to the drawing.

(First Embodiment)

FIG. 1 is a block diagram showing the outline configuration of a communicating system in a first embodiment. This communicating system includes a communication device 101, a control device 301, a first external device 401, and a second external device 402, which are connected to one another over a communication network 601. The communication device 101 includes a communication I/F 102, a communicator 103, a communication keeper 104, a transmission cycle determiner 105, a measurement necessity decider 106, and a measurement necessity information storage 107.

The communication network 601 includes one or more relay devices 201 and a network 501. The relay devices 201 are disposed between the network 501 and the communication device 101, one of which is connected to the communication device 101 in a wired or wireless manner. The network 501 may also include one or more relay devices. Hereafter, the relay devices in the network 501 will be supposed to be referred to as the reference numerals 201. The relay devices 201 are assumed to be of any type of devices such as routers in a public switched telephone network, broadband routers or ONUs installed in homes, load balancers, firewalls, or proxies installed in a server-side intranet (e.g., data center). The relay devices 201 may be disposed not between the network 501 and the communication device 101 but only in the network 501. The relay device 201 may have an NAT function such as LSN (Large Scale NAT). One of the relay devices 201 may be a broadband router, to which the communication device 101 is connected in a wired or wireless manner.

The network 501 may be a wide area network such as the Internet and a NGN (Next Generation Network), or a closed network such as a local area network. In addition, the network 501 may be a wired network, a wireless network, or a hybrid network of both. Communication among the devices over the network 601 is assumed to be performed under a WebSocket protocol such as TLS (Transport Layer Security) but may be performed under another TCP (Transmission Control Protocol) based communication protocol such as MQTT and HTTP long polling (Comet), or a UDP (User Datagram Protocol) based connectionless communication protocol. Therefore, it should be understood that the term "connection" used in the present embodiment is not limited to a connection under the TCP protocol but refers to a communication channel between a communication device and an external device across a relay device such as NAT.

The first external device 401 and the second external device 402 may exist in the same network such as an intranet, and in the present embodiment, these devices are assumed to exist in the same network.

The communication device (controlled device) 101 has a communicating function and may be installed in an internet appliance (e.g., air conditioner, illumination, digital television) or a device (e.g., PC) that is subjected to remote control by the control device 301. The control device 301 is a client terminal (e.g., smartphone, notebook pc) that performs the remote control the communication device 101. An end user performs remote control on the communication device 101 (e.g., remote monitoring, turning ON and OFF of the power supply thereof, changing the settings thereof) via an application or a Web browser installed in the control device 301. The remote control is assumed to be performed from the outside of the network (e.g., where one has gone to) to which the communication device 101 belongs but may be performed from the inside of the network of the communication device 101. The control device 301 is connected to the network 501 in a wired or wireless manner. The start of communication to control the communication device 101 is triggered by the control device 301, and the control device 301 starts and performs the communication to perform the remote control on the communication device 101 via the first external device 401 and the communication network 601.

The relay device 201 may have, as described above, a NAT (Network Address Translation) function. For example, assume that the relay device 201 connected to the communication device 101 is a broadband router and has the NAT function. In this case, in the state where a communication connection with the communication device 101 is not established, some NAT table settings may not allow for starting communication with the communication device 101 from the outside of a home network to which the communication device 101 belongs but allow for only communication started from the communication device 101 side.

The communication device 101 keeps a communication connection (first connection) with the first external device 401 all the time so as to allow the control device 301 to control the communication device 101 at any time. The first external device 401, upon receiving a request for remote control (remote control request) from the control device 301, can thereby transfer the remote control request to the communication device 101, which enables high-speed and efficient control. Here, if the control device 301 is not connected and thus a state continues for a while where the remote control is not performed and no packets flow at all in the first connection (no-communication state), one of the relay devices 201 existing on a communication route between the communication device 101 and the first external device 401 may disconnect the connection. For this reason, to keep the first connection all the time, the communication device 101 periodically transmits a packet to keep the connection (a keep-alive packet or heartbeat packet; hereafter, uniformly referred to as a keep-alive packet) to the first external device 401 via the first connection. The first external device 401 transmits a response packet for the keep-alive packet to the communication device 101. It is thereby possible to prevent the first connection from being cut off for the reason that no communication occurs in a direction from the first external device 401 to the communication device 101 (a direction from the outside to the inside) (some configuration of the NAT table of a relay device may allow the first connection to be kept even if the first external device 401 transmits no response packet). Note that it is conceivable to replace a response packet with an ACK packet for the keep-alive packet, but the transmission of an ACK packet may not be treated as a communication to keep the connection, and thus it is desirable to use a response packet defined for this purpose only as the response packet for the keep-alive packet.

A time that elapses until each relay device 201 disconnects the connection is determined by the timeout value of a NAT table or the like that is set in each relay device 201 in advance. The time to disconnect the connection is regulated by the smallest timeout value among the timeout values of all the relay devices 201 existing on the communication route. The smallest value among the timeout values of all the relay devices 201 existing on the communication route will be hereafter referred to as the timeout value of the route. Therefore, a transmission cycle of the keep-alive packets must to be shorter than the timeout value of the route between communication device 101 and the first external device 401.

However, transmitting the keep-alive packets at a short cycle leads to an increase in processing load on the first external device 401. In addition, this leads to an increase in cost if the first external device 401 is a server in a cloud computing service that is charged in accordance with a traffic. Therefore, it is desirable that the transmission cycle of the keep-alive packets be less than the timeout value of the route and as close thereto as possible.

To determine the transmission cycle of the keep-alive packets that satisfies such a condition, the communication device 101 transmits, in addition to the keep-alive packet, a packet for measurement (measurement packet) to the first external device 401. This measurement packet is transmitted via the first connection. A payload field or a header of a measurement packet transmitted by the communication device 101 may contain, for example, information to identify that the measurement packet is one transmitted by the communication device 101 (e.g., a predetermined value, random number, or any other value), or identification information on the communication device 101 (source identifying information).

In contrast, the communication device 101 establishes a communication connection (second connection) with the second external device 402, the communication connection being used for measurement of the transmission cycle. The second external device 402 receives the measurement packet, received by the first external device 401 via the first connection, from the first external device 401 and transfers this measurement packet to the communication device 101 via the second connection. When the measurement packet is transferred to the communication device 101 via the first external device 401 and the second external device 402, the IP header or the like of the measurement packet is changed as appropriate according to transfer stages. Note that the value of the payload field may be kept to be the same value, or may be changed, deleted, or added with new information. As examples of IP address in the IP header, the source IP address and the destination IP address of a measurement packet transmitted from the communication device 101 are the communication device 101 and the first external device, respectively, the source IP address and the destination IP address of a measurement packet transmitted from the first external device 401 to the second external device 402 are the first external device 401 and the second external device 402, respectively, and the source IP address and the destination IP address of a measurement packet transmitted from the second external device 402 to the communication device 101 are the second external device 402 and the communication device 101, respectively. The values of a source port number and a destination port number are similarly set as appropriate according to a connection to be used and transfer stages.

As a specific action example, the first external device 401 detects identification information (the IP address, a set of the IP address and the source port number, or the like of the communication device 101) on the communication device 101 and the first connection from the header of a measurement packet, and transmits the detected identification information to the second external device 402 together with the payload data of the measurement packet. Then, the second external device 402 identifies the second connection and the communication device 101 based on the identification information on the communication device 101, adds a header to the received payload data to generate a packet, and transmits the packet to the communication device 101. The measurement packet is thereby transmitted via the first and second external devices.

By performing processing of checking whether the second connection can receive a measurement packet while changing an interval to transmit measurement packets from the communication device 101, the timeout value of the route is estimated and the transmission cycle of keep-alive packets to be transmitted in the first connection is determined. In the case where the second external device 402 exists in the same network as the first external device 401, the route between the communication device 101 and the first external device 401, and a route between the communication device 101 and the second external device 402 are identical, and thus the timeout values of the routes can be considered to be the same. In addition, unlike the first connection in which packets relating to a remote control between the control device 301 and the communication device 101 flow, the second connection is used only for the measurement. For this reason, even the disconnection of the second connection in the measurement has no influence on the first connection.

In the first embodiment, the communication device 101 is assumed to hold in advance destination information such as the IP addresses of the first external device 401 and the second external device 402 to be connected, authentication information required for the connection, and the like.

To control the communication device 101, the control device 301 establishes a communication connection (third connection) with first external device 401 to connect to the first external device 401. At this point, the control device 301 is assumed to hold in advance the destination information on the IP addresses and the like of the first external device 401 and the authentication information required for the connection. The control device 301 closes the third connection when completing the remote control.

The first external device 401 relays the communication between the control device 301 and the communication device 101. The first external device 401 processes a two-way communications protocol assuming the permanent connection with the communication device 101. Conceivable communication protocols include WebSocket and MQTT and may include the other protocols. For example, CoAP (Constrained Application Protocol), STUN (Simple Traversal of UDP through NATs), and the like, which are based on a UDP protocol being connectionless, may be included. When receiving a remote control request from the control device 301, the first external device 401 detects the communication device 101 being a destination based on information or the like contained in a packet and transfers the remote control request to the communication device 101. In addition, when receiving a measurement packet from the communication device 101 via the first connection, the first external device 401 transfers the measurement packet to the second external device 402. In the case where the first external device 401 and the second external device 402 exist in the same network, the transfer of measurement packets is performed not via the network 601.

The second external device 402 establishes the second connection, used to measure the timeout value of the route between the communication device 101 and the first external device 401, with the communication device 101. When receiving a measurement packet from the first external device 401, the second external device 402 transfers the measurement packet to the communication device 101 via the second connection. The meaning of transferring a measurement packet follows the meaning described the above.

In the present embodiment, a communication route between the second external device 402 and the communication device 101, and a communication route between the first external device 401 and the communication device 101 are the same, and thus the timeout values of the first connection and the second connection can be considered to be the same. Therefore, applying the transmission cycle determined through the measurement using the second connection to the first connection raises no problem. If the first connection is used for the measurement, the measurement may be disturbed by other packets such as a remote control request from the control device 301. In addition, some measuring method may disconnect the first connection in the middle of the measurement, and the control device 301 cannot control the communication device 101 during the disconnection, which is problematic.

In addition, if a measurement packet is directly transmitted from the communication device 101 to the second external device 402, the timeout count of the relay device 201 may be reset. That is, since the control device 301 triggers the start of the remote control between the control device 301 and the communication device 101, what is intended to be known in the present embodiment is how long does it take to cause a timeout from the last communication in a direction from the outside to the inside, that is, in a direction from the second external device 402 to the communication device 101. For this reason, the communication device 101 delivers a measurement packet to the second external device 402 via the first connection and receives the measurement packet via the second connection, to solve this problem.

Note that, in the case where the second external device 402 exists in a network different from that of the first external device 401, relaying equipment existing on the communication route is also different, which may decrease the precision of a transmission cycle to be measured. However, there is no problem even if the second external device 402 exists in the other network if the second external device 402 grasps relay devices 201 on a different route, as long as the timeout values of the different relay devices 201 are taken into account.

Next, units included in the communication device 101 will be described. The communication I/F 102 is wired or wireless communication interface. The communicator 103 has a TCP/IP communicating function, establishes a communication connection with the first external device 401 and the second external device 402, and transmits or receives packets via the communication I/F 102. When Websocket is applied, the function of Websocket is served by the communicator 103.

The communication keeper 104 causes a keep-alive packet to be transmitted to the communicator 103 via the first connection such that the relay device 201 does not disconnect the first connection. The keep-alive packet is transmitted at a predetermined transmission cycle, or at a transmission cycle determined by a transmission cycle determiner to be described hereafter. The communication keeper 104 receives a response packet for the keep-alive packet.

The transmission cycle determiner 105 determines the transmission cycle of keep-alive packets. The transmission cycle determiner 105 causes communicator 103 to transmit a measurement packet using the first connection after a candidate time to update the transmission cycle (candidate transmission interval time period) elapses from a time point when the second connection is established or a time point when a measurement packet is received via the second connection (or a time point when a measurement packet is received via the first connection). Receiving this measurement packet by the transfer by the first external device 401 and the second external device 402 via the second connection means that the second connection can be kept even if the transmission cycle of keep-alive packets is updated to the above-described candidate transmission interval time period. The transmission cycle of keep-alive packets is thus updated to the candidate transmission interval time period. By repeating similar processing while changing (e.g., increasing) the value of the candidate transmission interval time period, it is possible to determine the transmission cycle of keep-alive packets to be closer to the timeout value of the route. If no measurement packet is received from the second connection, the second connection can be supposed to have been disconnected and the candidate transmission interval time period in this case can be determined to be beyond the timeout value of the route. Therefore, in this case, the transmission cycle of keep-alive packets is not updated with this candidate transmission interval time period.

The candidate transmission interval time period may be selected from a list, caused to be held by the transmission cycle determiner 105, in which one or more candidate transmission interval time periods are recorded in advance. In addition, the initial value of the candidate transmission interval time period may be determined and a value calculated by function such as a linear function, exponential function, and random function may be added thereto step by step. In addition, the candidate transmission interval time period may be determined according to a predetermined algorithm rather than gradually increased from the initial value. For example, a suitable transmission cycle of keep-alive packets may be determined by repeating processing in which the measurement may be performed starting with a typical timeout value of the relay as an initial value, and the value may be increased if the second connection is not disconnected or decreased if the second connection is disconnected, as in a binary search. The candidate transmission interval time period may be gradually decreased rather than gradually increased. For example, in the case of an upper limit of 60, the upper limit may be gradually decreased like 60→30→15→ . . . , and a value at which a measurement packet can be first received may be employed. In addition, a fixed numerical value list (candidate transmission interval list) may be used. For example, taking into account the fact that a distribution of intervals of typical NAT timeouts is unbalanced such as 5 min, 15 min, 60 min, and the like, it is conceivable to prepare a candidate transmission interval list containing 4, 14, 59, and the like, and try them in turn. The following description will be made assuming the case of a gradual increase.

The measurement necessity decider 106 decides whether the transmission cycle determiner 105 needs to perform the measurement (measurement necessity decision) based on information on the state or the action history (operating history) of the communication device 101 (hereafter, referred to as measurement necessity information). As the measurement necessity information, various kinds of information are possible as long as the information relates to the state or the action history of the communication device 101. For example, information on the set value and the like or a running history of the communication device 101, a measurement history about the presence/absence or the number of the measurements, a previous measurement date and time, and the like, a connection history about a connection keeping time with the first external device 401, and the like are possible. As a specific example, the measurement necessity decision may be configured to be performed when the communication device 101 starts for the first time or reinitialized, when the main power supply of the communication device 101 is ON, when the time of start is within a certain period of time in the nighttime, and the like. In addition, for example, the measurement may be configured to be performed when if a time longer than a threshold value elapses from the previous measurement time point, or if a current transmission cycle is shorter than a threshold value. In addition, the threshold value may be varied using random numbers or a function.

The measurement necessity information storage 107 is a storage to store the measurement necessity information. The measurement necessity decider 106 may acquire, when performing the measurement necessity decision, the measurement necessity information from the measurement necessity information storage 107. The measurement necessity information storage 107 may acquire the measurement necessity information from a unit (not shown) that collects the measurement necessity information.

Figure 2:
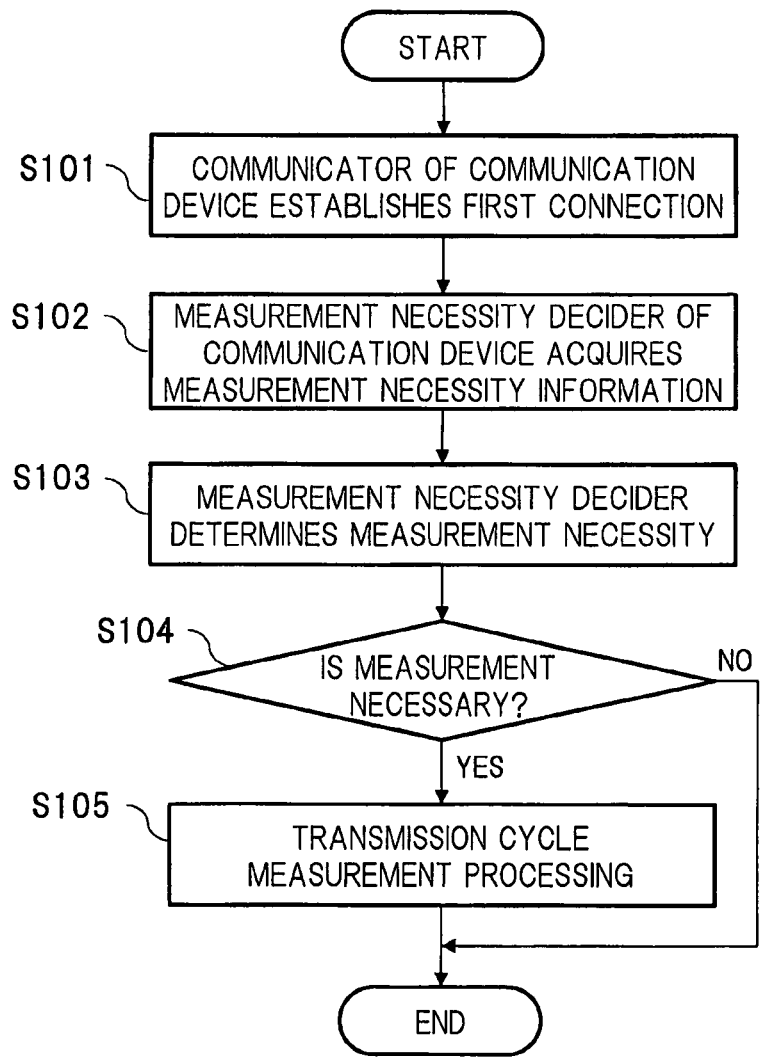
FIG. 2 is a flow chart of transmission cycle determination processing in the first embodiment.

FIG. 2 is a flow chart of processing (transmission cycle determination processing) of determining the transmission cycle in the first embodiment. The transmission cycle determination processing is assumed to be started at a timing that is set to the communication device 101 in advance and by the communication device 101 when the communication device 101 starts at the first time, reinitialized, and restarted, or when the disconnection of the first connection is detected.

The communicator 103 of the communication device 101 establishes the first connection based on a WebSocket protocol over TLS, with the first external device 401 (S101). The communication device 101 is assumed to hold information (destination information) used for the connection with the first external device 401. The destination information includes the URL, or the IP address and the port number of the connection destination. The communication device 101 that has established the first connection keeps the first connection by repeating the transmission of keep-alive packets at a predetermined cycle and the reception of response packets.

An establishment request for the first connection may contain information on a source device (a communication device) (source identifying information). The first external device 401 or the second external device 402 may store information on the communication device 101 (source identifying information) associating the information with the first connection and the second connection. The second external device 402 that receives a measurement packet transferred from the first external device 401 can thereby identify a communication device and the second connection to which the measurement packet should be transferred.

The source identifying information may be a communication device name or the name of a user who uses the communication device or information on a user who is registered in the first external device 401 in advance or on the communication device. Alternatively, the source identifying information may be information on each of the previous connections that are generated by the first external device 401 or the like at the time of establishing the connections.

In addition, the establishment request for the first connection may contain authentication information used to establish the first connection. The authentication information is used when an authentication is needed to establish the first connection. The authentication information may be a pre-shared key or a user password that is generated in units of the first connection or the communication device. Alternatively, the authentication information may be session identification information or the like generated at the time of previous authentication processing as long as the information can be used for the authentication with the first external device 401.

The measurement necessity decider 106 of the communication device 101 acquires the measurement necessity information from the measurement necessity information storage 107 (S102). A timing of the acquisition may be optionally determined. The measurement necessity decision is performed after the establishment of the aforementioned first connection (S101) in the present measurement processing but may be performed prior to the establishment.

The measurement necessity decider 106 determines whether to perform transmission cycle measurement processing by performing the measurement necessity decision based on the measurement necessity information (S103).

If determining to perform the transmission cycle measurement processing (YES in S104), the communication device 101 performs the transmission cycle measurement processing (S105) and updates the transmission cycle of keep-alive packets as needed. If determining not to perform the transmission cycle measurement processing (NO in S104), the communication device 101 does not perform the transmission cycle measurement processing and finish the transmission cycle determination processing.

Figure 3:
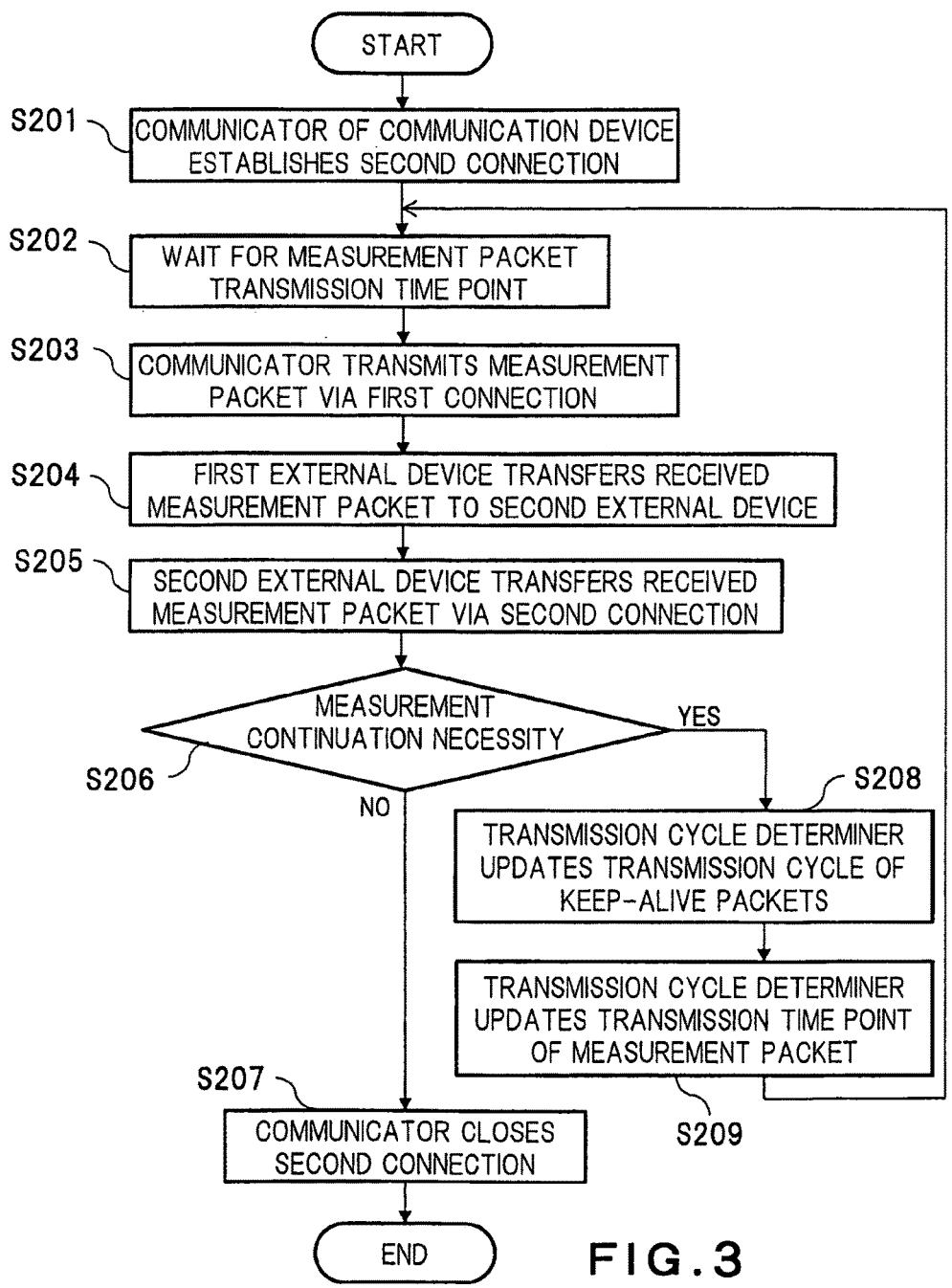
FIG. 3 is a flow chart of transmission cycle measurement processing in the first embodiment.

FIG. 3 is a detailed flow chart of the transmission cycle measurement processing (S105). The communicator 103 of the communication device 101 establishes the second connection used for the transmission cycle measurement processing with the second external device 402 (S201). The communication device 101 is assumed to hold information (destination information) used for the connection with the second external device 402. The destination information includes the URL, or the IP address and the port number of the connection destination.

The communication device 101 waits for a transmission time point of a measurement packet after establishing the second connection (S202). The transmission time point of the first measurement packet is a time point at which a time interval to be measured (a time point at which the candidate transmission interval time period elapses). The initial value of the candidate transmission interval time period may be made to be identical to a time point at which a time period of the transmission cycle of keep-alive packets elapses from the time point at which the second connection is established.

The communication device 101 transmits a measurement packet to the external device 401 via the first connection at a measurement packet transmission time point (S203). The first external device 401 receives the measurement packet via the first connection and transfers the measurement packet to the second external device 402 (S204). To determine a packet received by the first external device 401 to be the measurement packet, the measurement packet may contain packet type information indicating that the packet is the measurement packet. Alternatively, with a packet to be transmitted by the communication device 101 containing information on the second external device 402 that is a transfer destination and on the second connection, a setting may be made such that the packet containing the information is transferred to the second external device 402. The setting of transferring to the second external device 402 may be made in advance or when the first connection is established.

When the measurement packet is transferred from the first external device 401, the second external device 402 identifies the communication device 101 to be a transfer destination of the measurement packet and the second connection and transfers the measurement packet to the communication device 101 via the second connection (S205).

To cause the second external device 402 to select the communication device 101 and the second connection, a measurement packet to be transmitted by the communication device 101 may contain information on the second connection as the source identifying information. Alternatively, with identification information on the communication device 101 being contained in a measurement packet to be transmitted by the communication device 101 as the source identifying information, the second external device 402 may select the second connection according to the association between the identification information on the communication device 101 stored at the time of the establishment of connection and the second connection.

The communication device 101 determines whether to continue the measurement when the measurement packet transferred from the second external device 402 is received or a certain amount of time elapses from the transmission of the measurement packet without the measurement packet being received (S206). If the measurement packet is received and a predetermined condition is satisfied (YES in S206), the communication device 101 updates the transmission cycle of keep-alive packets (S208) and sets the next transmission time point of the measurement packet at a time point obtained by adding the next candidate transmission interval time period to the time point at which the measurement packet is received via the second connection (alternatively, a time point at which a measurement packet is transmitted via the first connection immediately prior thereto or the other time point optionally defined. The communication delay of a packet or a processing time in each device can be considered to be small as compared with the transmission cycle. The same is true for the following description.) (S209). Then, a new transmission time point is waited for (S202) and this processing is repeated. Here, examples of the case where the predetermined condition is satisfied include the case where the number of trials (the number of transmissions of measurement packets) does not reach a certain value or the case where the candidate transmission interval time period is less than a threshold value. If the measurement packet is not received or the predetermined condition is not satisfied (NO in S206), the transmission cycle measurement processing is finished and the second connection is closed (S207). The other examples of the case where the predetermined condition is not satisfied may include the case where a halt command of the transmission cycle determination processing is received from one of the first external device 401 and the second external device 402. The first external device 401 or the second external device 402 may transmit the halt command via the first connection or the second connection when a predetermined event occurs. Alternatively, the case where the communication via the first connection or the second connection is finished may be included therein. Note that the decision of a measurement continuation necessity may be performed by the measurement necessity decider 106. In addition, the transmission cycle may be updated once after completion of the transmission cycle measurement processing rather than every transmission of the measurement packet. In this case, for the transmission cycle of keep-alive packets, a value before the processing of this flow may be used until the transmission cycle measurement processing is finished.

Note that in the processing of this flow chart, the first external device 401 or the second external device 402 may determine to stop the transfer of the measurement packet. In addition, instead of the measurement packet, a packet to instruct the communication device 101 to stop or not to continue the transmission cycle measurement processing. The communication device 101 may be configured to stop the transmission cycle measurement processing when receiving such a packet.

Figure 4:
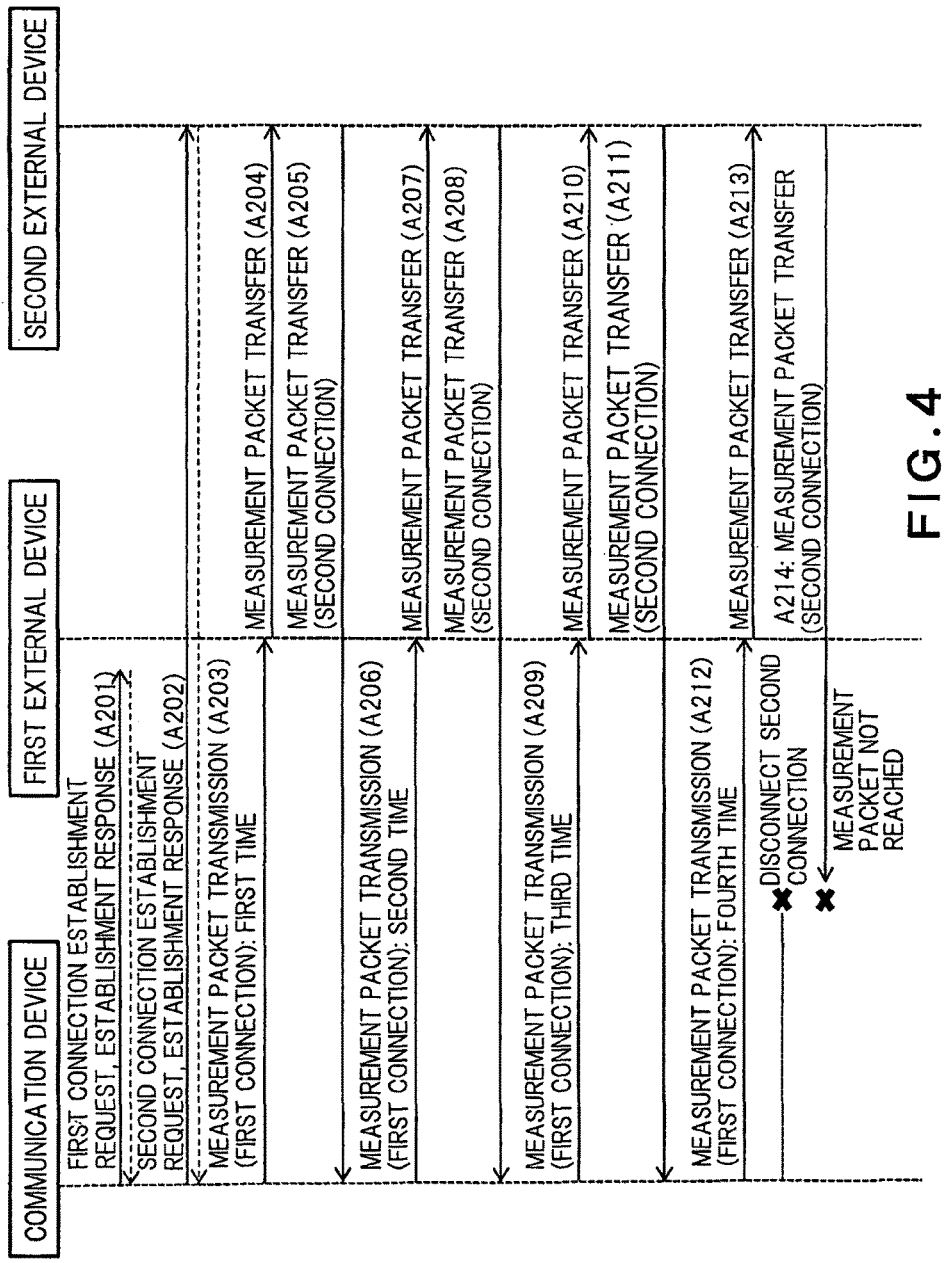
FIG. 4 is a diagram showing an example of a communication sequence in the transmission cycle determination processing in the first embodiment.

FIG. 4 is a diagram showing an example of a communication sequence at the time of the transmission cycle determination processing. The communication device 101 transmits an establishment request of the first connection to the first external device 401, and the first external device 401 transmits the establishment response of the first connection. The first connection is thereby established (A201). Thereafter, the first connection is kept by the transmission of a keep-alive packet by the communication device 101 and the reception of the response packet (note that some configuration of the NAT table of a relay device may allow the first connection to be kept even if no response packet is received). As mentioned above, the first external device 401 may transmit a response packet to the communication device 101 in response to the keep-alive packet via the first connection.

Next, the communication device 101 transmits an establishment request of the second connection to the second external device 402, and the second external device 402 performs an establishment response of the second connection. The second connection is thereby established (A202). Note that, in the second connection, the communication device 101 transmits no keep-alive packet.

Next, the communication device 101 waits for M seconds (M is a positive real number) and thereafter transmits a measurement packet via the first connection (A203). This M is the initial value of the candidate transmission interval time period, and this value may be optionally determined. For example, this value may be determined to be twice the current transmission cycle of keep-alive packets or the like. Upon receiving the measurement packet, the first external device 401 immediately transfers the measurement packet to the second external device 402 (A204). The second external device 402 further transfers the received measurement packet to the communication device 101 via the second connection (A205). It is assumed here that the relay device 201 does not disconnect the second connection yet, and the communication device 101 can receive the measurement packet.

The communication device 101, determining that the transmission cycle measurement processing can be continued, performs the transmission cycle measurement processing in the second time (A206 and A207). In addition, the communication device 101 can receive the measurement packet (A208) and thus, determining that no problem occurs if the transmission cycle of keep-alive packets is updated to M seconds, updates the transmission cycle of keep-alive packets to M seconds. The candidate transmission interval time period used in the transmission cycle measurement processing in the second time may be also optionally determined. In this communication sequence example, the candidate transmission interval time period is changed M+L, which is the initial value M increased by L seconds (L is a positive real number). The communication device 101 waits for a time point M+L seconds after the time point at which the measurement packet is received. Note that, before A206, a keep-alive packet and the response thereto may be configured to be transmitted and received on the second connection. In the present embodiment, supposed connections are TCP based, but if supposing a UDP protocol in particular, it is conceivable to perform timeout measurement more accurately by updating a NAT table on a route in two directions (communication device→external device and external device→communication device).

After waiting, the communication device 101 transmits again a measurement packet via the first connection (A209). The first external device 401 and the second external device 402 also perform processing as in the previous time, and the measurement packet is returned to the communication device 101 (A210 and A211). The communication device 101, determining that the transmission cycle measurement processing can be continued, determines to perform again the transmission cycle measurement processing, and updates the transmission cycle of keep-alive packets to M+L seconds. The candidate transmission interval time period is changed to M+2L, which is the previous candidate transmission interval time period increased by L seconds. The communication device 101 waits for a time point M+2L seconds after the time point at which the previous measurement packet is received. Since a measurement packet can be received also in the third transmission cycle measurement processing, the communication device 101 updates the transmission cycle of keep-alive packets to M+2L seconds, and waits for a time point M+3L seconds after the time point at which the previous measurement packet is received. In the fourth transmission cycle measurement processing, the second external device 402 transfers a measurement packet via the second connection (A212 and A213), but the second connection is disconnected due to a timeout, and thus the measurement packet does not reach the communication device 101 (A214). Since the measurement packet does not reach even when the certain amount of time elapses, the communication device 101, determining that the measurement cannot be continued, finishes the transmission cycle measurement processing. As a result, the transmission cycle of keep-alive packets is determined to be M+2L seconds.

Figure 5:
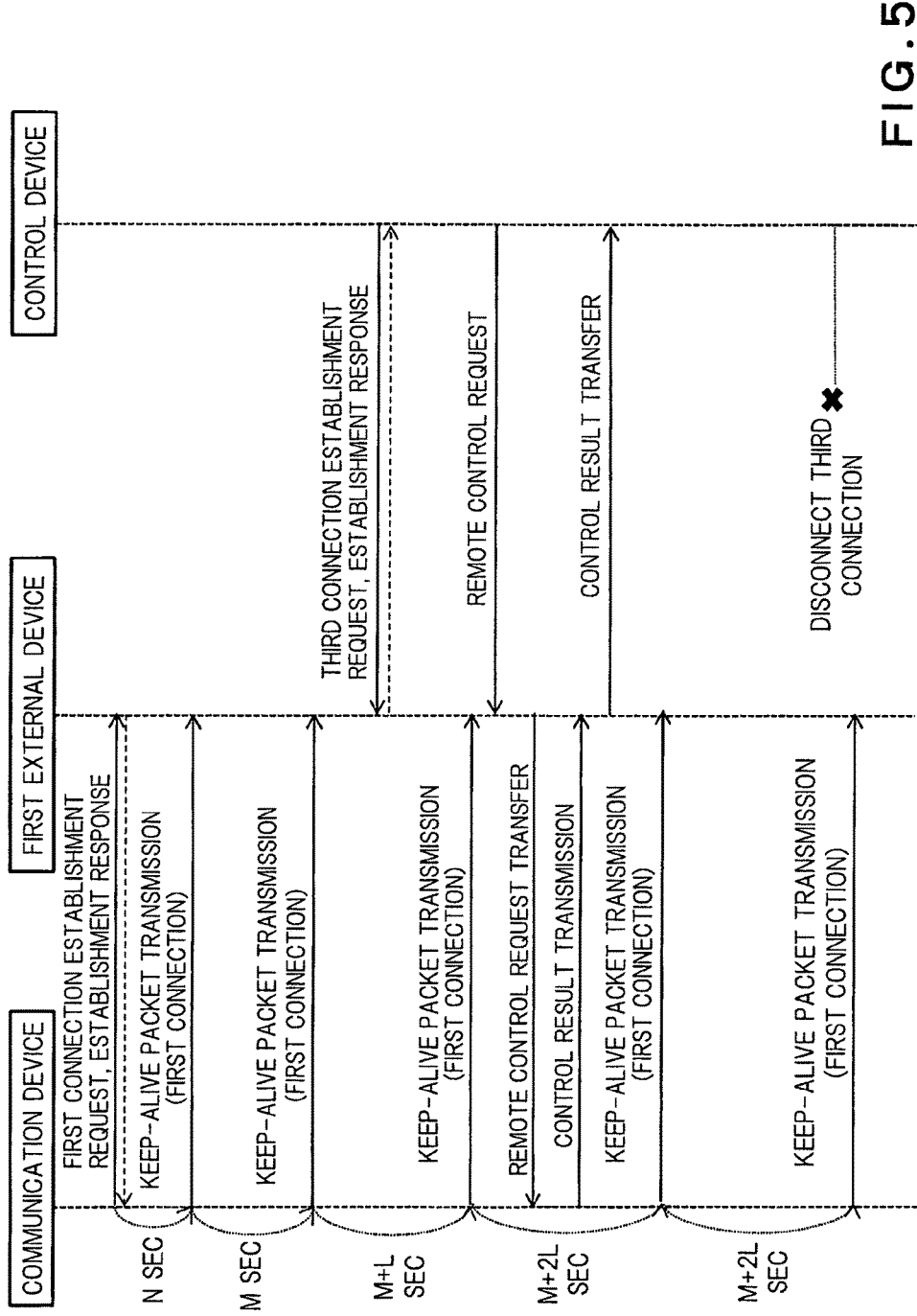
FIG. 5 is a diagram showing an example of a communication sequence in the case where the transmission cycle measurement processing in the first embodiment is performed concurrently with remote control communication.

FIG. 5 is a diagram showing an example of a communication sequence in the case where remote control communication between the control device 301 and the communication device 101 is performed concurrently with the transmission cycle measurement processing shown in FIG. 4. The communication device 101, after establishing the first connection with the first external device 401, periodically transmits keep-alive packets to keep the first connection. The transmission cycle of keep-alive packets is initially N seconds (N is a positive real number), but the transmission cycle of keep-alive packets is updated through the transmission cycle determination processing shown in FIG. 4. In FIG. 5, assume that the transmission cycle in the first time is N, M+L in the second time, and M+2L in the third time (note that, a keep-alive packet may be transmitted before the transmission cycle is updated depending on the sizes of N, M, and L. In this case, the keep-alive packet is transmitted at the same cycle as the previous time). Since the transmission cycle determination processing in the fourth time has failed, keep-alive packets in the fourth and subsequent times are transmitted at a cycle remaining M+2L.

The control device 301 performs an establishment request of the third connection to the first external device 401 at a timing desired by a user. At this point, the control device 301 may transmit source identifying information on the user and the communication device 101 together, as in the establishment of the first connection, so as to be able to transfer a packet transmitted via the third connection to the first connection. When receiving the establishment request of the third connection from the control device 301, the first external device 401 transmits an establishment response of the third connection to the control device 301. The third connection is thereby established.

After the establishment of the third connection, the control device 301 transmits a remote control request to the first external device 401. The remote control request may contain the source identifying information such that the first external device 401 can transfer the remote control request to the first connection.

The first external device 401 transfers the remote control request received via the third connection to the communication device 101 via the first connection. At this point, the first external device 401 may confirm that no problem occurs when the remote control request is transferred from the third connection to the first connection, using information on the control device 301 (source identifying information), authentication information, and the like.

The communication device 101 transmits a control result to the first external device 401 via the first connection. A packet relating to this control result may also contain the source identifying information on the communication device 101. The first external device 401 transfers the received control result to the control device 301 via the third connection. The first external device 401 may confirm that no problem occurs with the transfer from the first connection to the third connection, using the source identifying information, the authentication information, and the like. The control device 301 disconnects the third connection when finishing the remote control.

As described above, according to the first embodiment, by performing the measurement using the second connection, it is possible to determine the transmission cycle of keep-alive packets without causing a downtime of the first connection. Therefore, it is possible to suppress influences on communication in an actual service using the first connection (remote control communication from the control device 301 to the communication device 101). In addition, it is possible to curb costs by expanding (prolonging) the transmission cycle of keep-alive packets as long as possible. In addition, it is possible to suppress loads on the first external device by establishing the second connection not with the first external device 401 but with the second external device 402 or reducing the number of times of establishing the second connection by the measurement necessity decider 106.

(Second Embodiment)

Figure 6:
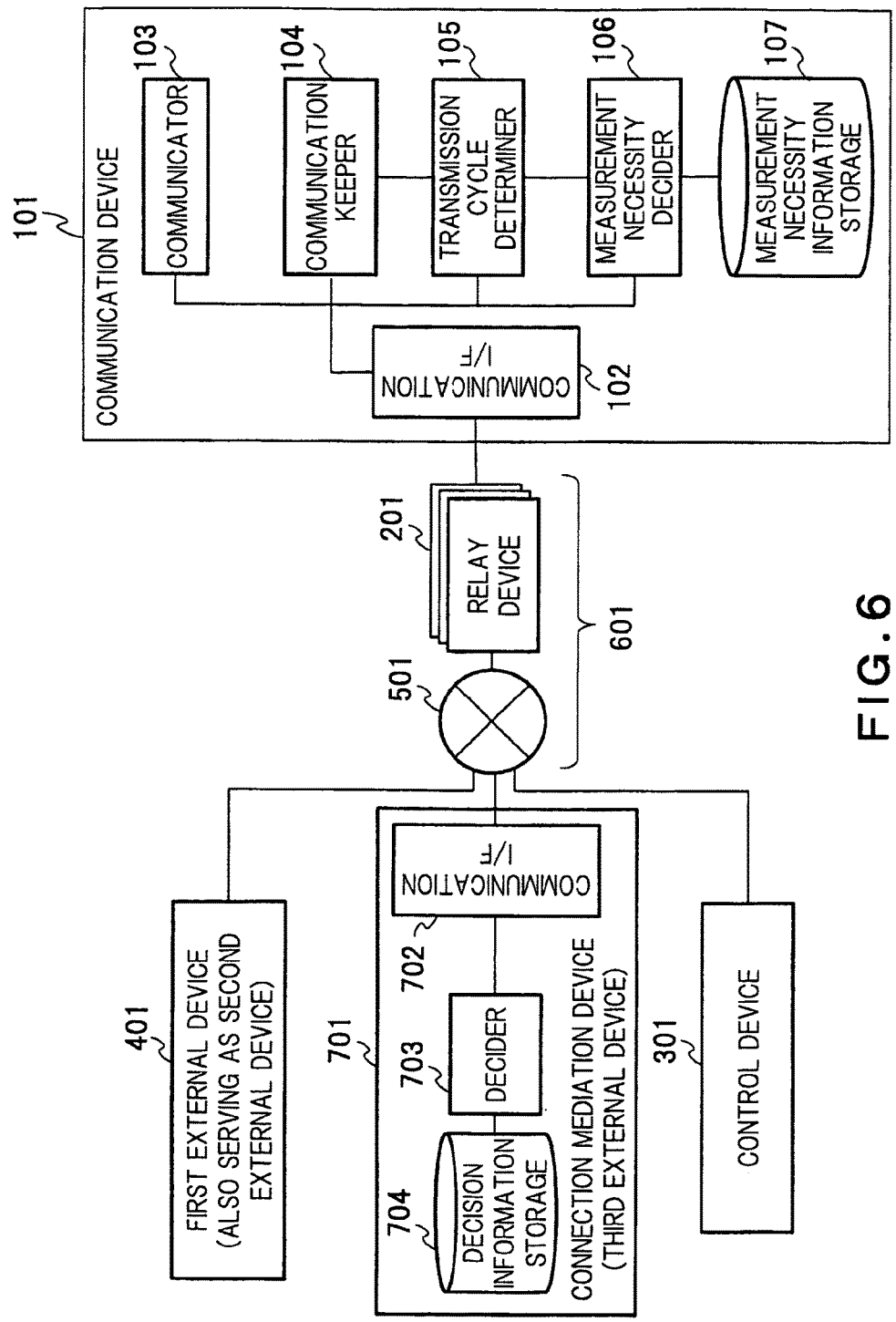
FIG. 6 is a block diagram showing the outline configuration of a communicating system in a second embodiment.

FIG. 6 is a diagram showing a communicating system in a second embodiment of the present invention. As compared to the first embodiment, a connection mediation device (server device) 701 is added as a server device being a third external device. In addition, it is assumed that the second external device 402 does not exist and both the first connection and the second connection are established with first external device 401. The connection mediation device (server device) 701 includes a communication I/F 702, a decider 703, and a decision information storage 704.

In the first embodiment, the measurement necessity decider 106 of the communication device 101 performs the measurement necessity decision, but in the second embodiment, the connection mediation device 701 performs the measurement necessity decision. However, the measurement necessity decider 106 may continue to perform the measurement necessity decision, or measurement necessity decisions performed by the both units may be performed based on different pieces of measurement necessity information.

The decider 703 performs the measurement necessity decision based on the measurement necessity information and transmits measurement instructing information containing a decision result (i.e., information on whether measurement is necessary) to the communication device 101 via the communication I/F 702. The measurement necessity information and the deciding method of the measurement necessity decision may be identical to or different from those used by the measurement necessity decider 106 in the first embodiment.

The decision information storage 704 is a storage to store the measurement necessity information. The measurement necessity information may contain not only information on the communication device 101 in the measurement necessity information storage 107 in the first embodiment but also information on the first external device 401, information on the control device 301, the history of remote control or measurement, and the like. These pieces of information may be acquired by the connection mediation device 701 polling the devices or transmitted by the devices to the connection mediation device 701 at any timing. In addition, the decision information storage 704 may include a plurality of storages for the kinds of the information. For example, the storages may be separated into a storage to store information on the measurement, a storage to store information on devices such that the communication device 101 and the first external device 401, a storage to store the authentication information, and the like.

Figure 7:
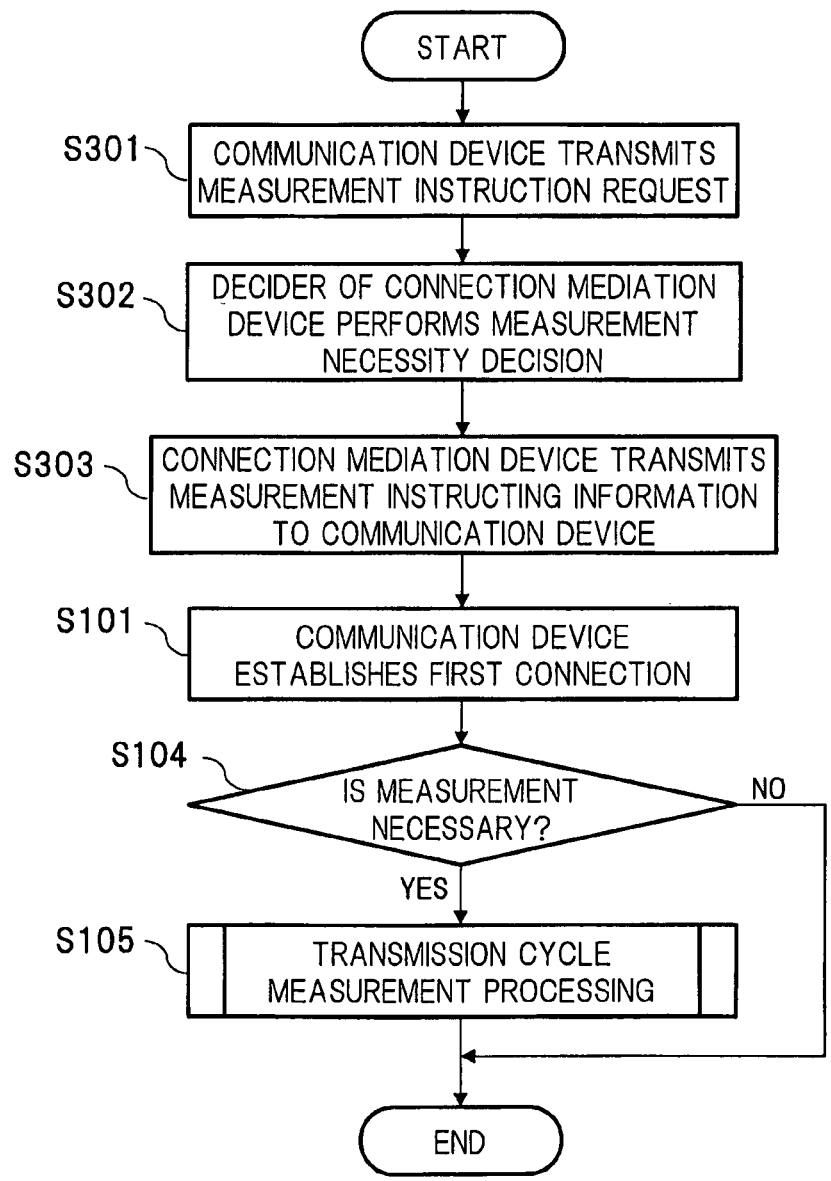
FIG. 7 is a flow chart showing transmission cycle determination processing in the second embodiment.

FIG. 7 shows a flow chart of transmission cycle determination processing in the second embodiment. The transmission cycle determination processing in the second embodiment is also started, as in the first embodiment, by the communication device 101 at a predetermined timing. The communication device 101 transmits a measurement instruction request to the connection mediation device 701 (S301). When receiving the measurement instruction request, the connection mediation device 701 performs measurement necessity decision (S302) and transmits measurement instructing information containing a decision result to the communication device 101 (S303).

The communication device 101 establishes the first connection with the first external device 401 (S101).

Subsequent processing is the same as that in the first embodiment. In this flow, the communication device 101 performs the measurement instruction request before establishing the first connection with the first external device 401 (S301) but may perform the measurement instruction request after establishing the first connection. In addition, the flow chart of the transmission cycle measurement processing in the second embodiment is the same as that in the first embodiment except that the second external device 402 is replaced with the first external device 401, and that there is no transfer of measurement packet from the first external device 401 to the second external device 402 (S204).

Figure 8:
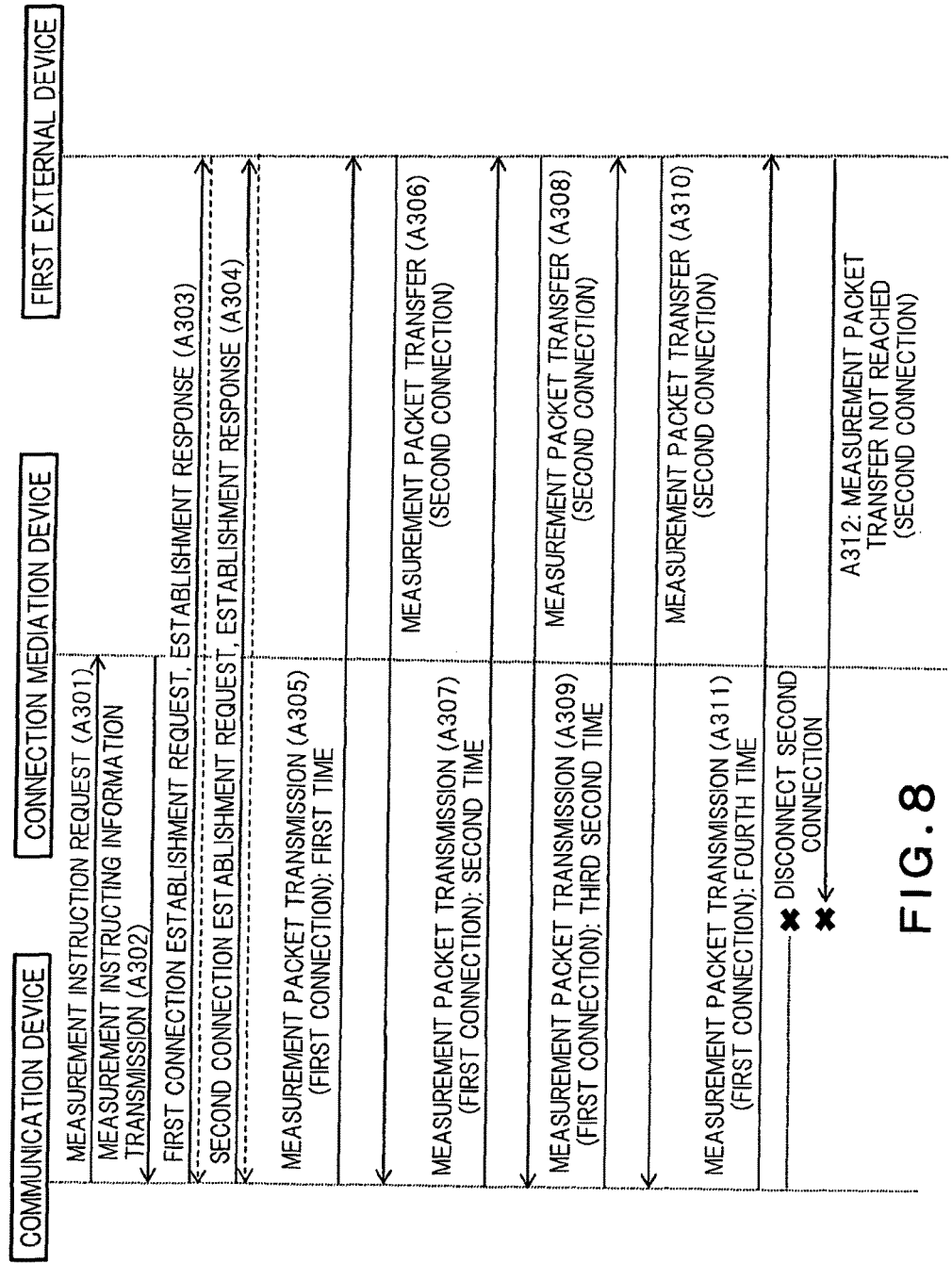
FIG. 8 is a diagram showing an example of a communication sequence in the transmission cycle determination processing in the second embodiment.

FIG. 8 is a diagram showing an example of a communication sequence of the transmission cycle determination processing in the second embodiment. Matters different from the communication sequence in FIG. 4 will be described.

First, the communication device 101 transmits a measurement instruction request to the connection mediation device 701 (A301). The measurement instruction request may contain, as in the establishment of connection, the source identifying information and the authentication information.

The connection mediation device 701 performs the measurement necessity decision and transmits measurement instructing information containing the decision result of measurement necessity (A302). Note that, if the measurement is disabled, the transmission of the measurement instructing information can be omitted. If the measurement is enabled, that is, an instruction for the measurement is given, the measurement instructing information may contain identification information on the second connection, information indicating that the communication device 101 is a communication device to which the establishment of the second connection is permitted, and secret information to verify the validity of the information. This allows only the communication device 101 that is authenticated by the connection mediation device 701 to establish the second connection, which enhances security. In addition, the measurement instructing information may contain destination information necessary for the establishment of communication connection to the first external device. The communication device 101 thereby dispenses with the necessity of holding information necessary to establish the second connection in advance, which enhances the manageability of the system. Furthermore, the measurement instructing information may contain information used for the transmission cycle measurement processing such as a list of the candidate transmission interval time periods, a function, and an algorithm. It is thereby possible to freely change the measuring method independently of the set value of the communication device 101. In addition, the measurement instructing information may contain a measurement starting time point, which enables the transmission cycle measurement processing to start also in the nighttime, when the traffic is light.

When receiving the measurement instructing information containing a decision result indicating that the measurement is enabled, that is, when being instructed to perform the transmission cycle measurement processing, the communication device 101 establishes the first connection (A303) and thereafter transmits an establishment request of the second connection to the first external device 401 (A304).

The decision result indicating that the measurement is enabled is not necessarily contained as an explicit piece of information, and for example, when information on the second connection such as identification information on the second connection is contained, it can be determined that the instruction of the measurement is given. Note that, to establish the second connection, port numbers other than those used for the first connection (the port number on the communication device 101 side and the port number on the first external device side) may be used at the time of the establishment request of the second connection.

When receiving the measurement packet received from the communication device 101 using the first connection (A305), the first external device 401 transfers the measurement packet using the second connection (A306). To identify the second connection to transmit the measurement packet, the first connection and the second connection may be associated using the source identifying information contained in the establishment request of the second connection at the time of the establishment of the second connection. Alternatively, the other methods similar to those described in the first embodiment may be used.

Subsequent communication is the same as that in communication sequence in FIG. 4 except that the first external device 401 serves the function of the second external device 402 (A307, A308, A309, A310, A311, and A312). In addition, the communication sequence relating to the remote control communication is the same as that in the first embodiment.

As described above, according to the second embodiment, the connection mediation device 701 can control the loads on the first external device by performing the measurement necessity decision. In the first embodiment, since the communication device performs the measurement necessity decision, a timing to perform the measurement processing is determined by each communication device 101. This results in a risk that many communication devices 101 perform the measurement processing in the same period of time, which may cause a resource shortage of the first external device 401 such as a memory. In contrast, in the second embodiment, the connection mediation device 701 decides whether the measurement is necessary (i.e. existence or non-existence of the measurement necessity) taking the situation and the like of the external device 401 into account, which enables such a situation to be avoided. In addition, for example, in the case of changing the measuring method of the transmission cycle measurement processing, only the connection mediation device 701 may be managed without changing the setting of each communication device 101. It is thereby possible to deal with, for example, the case of changing the measuring method of the transmission cycle measurement processing.

(Third Embodiment)

Figure 9:
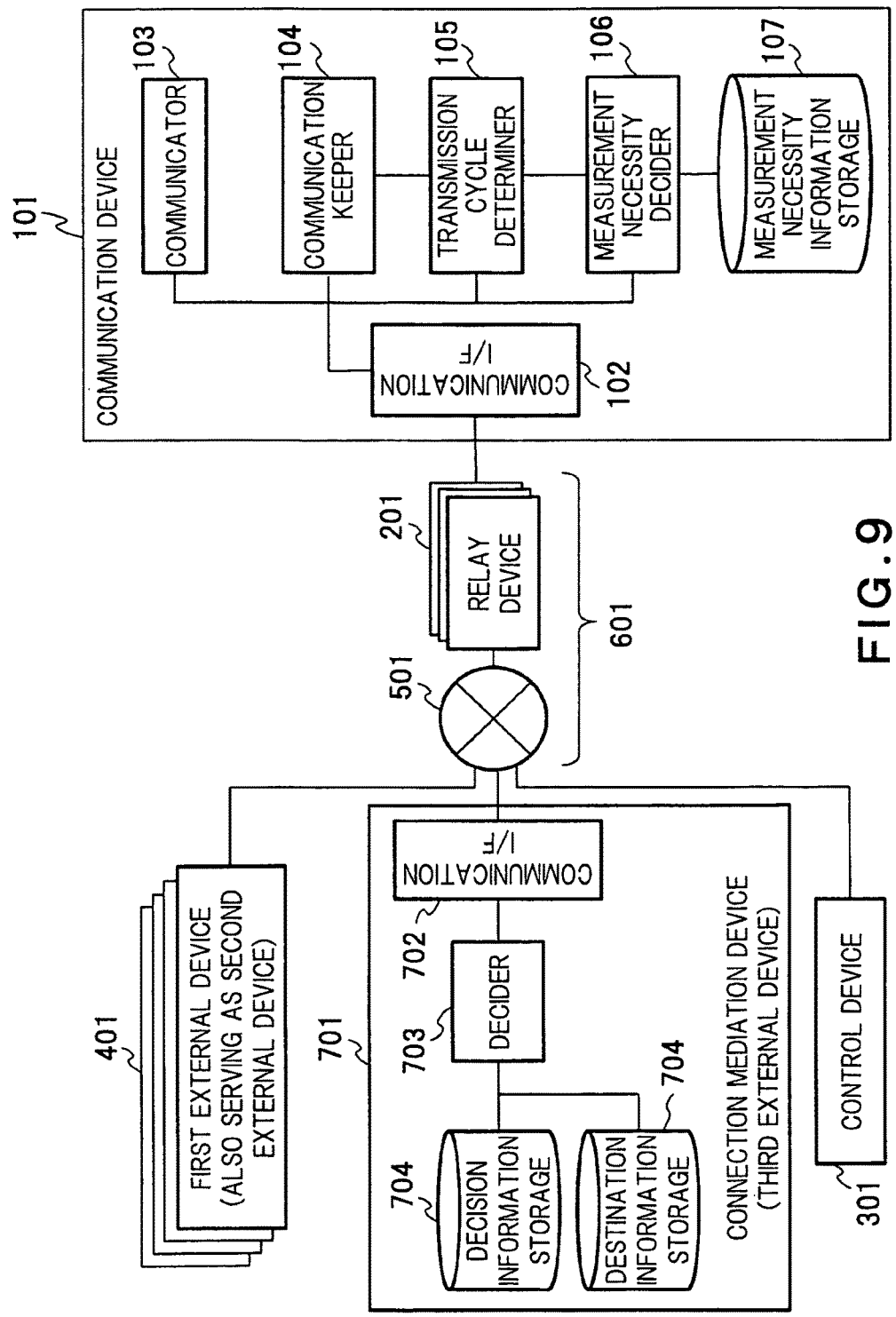
FIG. 9 is a block diagram showing the outline configuration of a communicating system in a third embodiment.

FIG. 9 is a block diagram showing the outline configuration of a communicating system in a third embodiment. The third embodiment differs from the second embodiment in that there are a plurality of first external devices 401, and the connection mediation device 701 includes a destination information storage 705.

In the third embodiment, it is assumed that the communication device 101 and the control device 301 have destination information (e.g., an address) on the connection mediation device 701 but have no destination information (e.g., addresses) on the first external devices 401. For this reason, the communication device 101 and the control device 301 each transmit a destination instruction request to the connection mediation device 701 to acquire the destination information (e.g., addresses) on the first external devices 401 before being in connection with the first external devices 401.

The connection mediation device 701 determines a first external device to be a connection destination of the communication device 101 in response to the destination instruction request of the communication device 101. Information on the first external device determined as the connection destination is stored in the destination information storage 705. The information on the first external device determined as the connection destination is transmitted as destination information to the communication device 101. In addition, the connection mediation device 701 detects, in response to the destination instruction request from the control device 301, information on the first external device being the connection destination of the communication device 101 that is a control object of the control device 301 from the information storage 705 and transmits the information as a reply to the control device 301.

Figure 10:
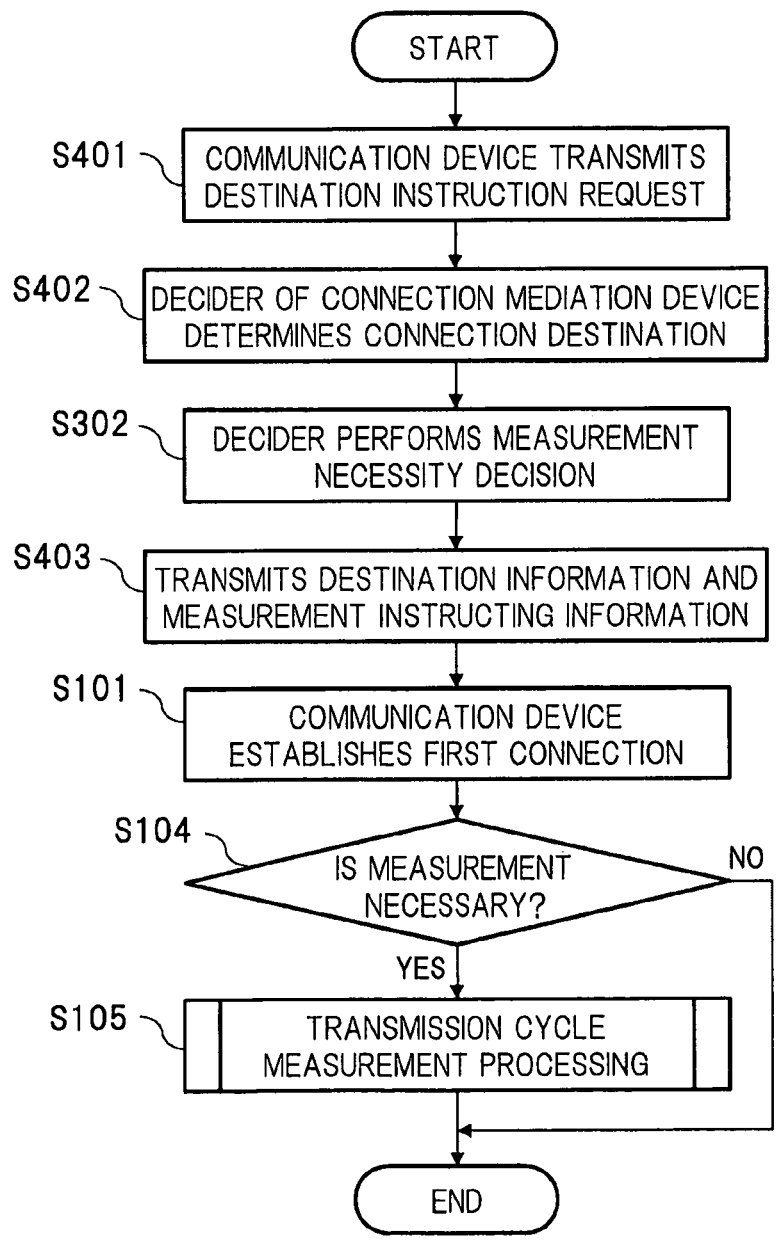
FIG. 10 shows a flow chart of transmission cycle determination processing in the third embodiment.

FIG. 10 shows a flow chart of transmission cycle determination processing in the third embodiment. In the third embodiment, the communication device 101 transmits a destination instruction request to the connection mediation device 701 at a predetermined timing such as restarting (S401). However, for example, in the case where the communication device 101 saves the destination information on the first external device 401 that is a previous connection destination using a cache or the like and makes the destination information valid for a certain period of time to enable reconnection, the transmission of the destination instruction request may be dispensed with.

The decider 703 of the connection mediation device 701 determines the first external device to be the connection destination of the communication device 101 (S402). A determination may be performed by determination using a method similar to that of the measurement necessity decision in the second embodiment. In addition, the determination may be made taking into account an actual distance from the communication device 101, the hop count of the route, an expected timeout value of the route, and the like.

After the determination of the connection destination, the decider 703 of the connection mediation device 701 performs also the measurement necessity decision (S302). The measurement necessity decision may be performed as with the measurement necessity decision in the second embodiment. The decider 703 transmits information on the first external device (destination information) determined as the connection destination and measurement instructing information on existence or non-existence of the measurement necessity to the communication device 101 (S403). The destination information contains information such as the URL, IP address, port number of the first external device. The measurement instructing information is similar to that in the second embodiment.

Subsequent processing is similar to that in second embodiment. In addition, the flow chart of the transmission cycle measurement processing in the third embodiment is similar to that in the first embodiment except that the second external device 402 is replaced with the first external device 401, and that there is no transfer of measurement packet from the first external device 401 to the second external device 402 (S204). In addition, a communication sequence relating to the transmission cycle measurement processing is the same as that in the first embodiment except that a request transmitted by the communication device 101 is changed from a measurement instruction request to a destination instruction request, and that measurement instructing information is transmitted to the communication device 101, as well as destination information.

Figure 11:
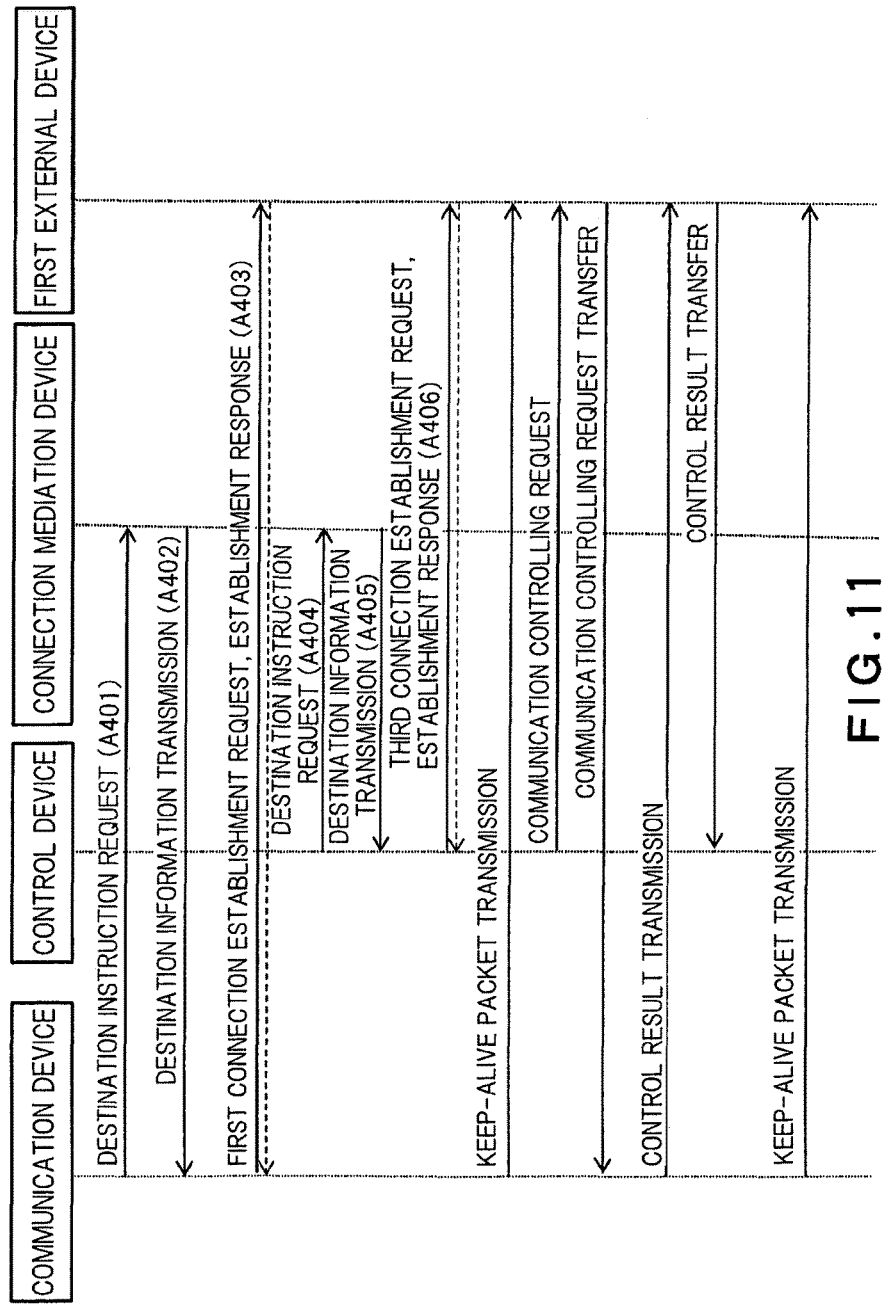
FIG. 11 is a diagram showing an example of a communication sequence in the case where transmission cycle measurement processing in the third embodiment is performed concurrently with remote control communication.

FIG. 11 is a diagram showing the communication sequence relating to the remote control communication in the third embodiment.

The communication device 101 transmits a destination instruction request to the connection mediation device 701 (A401), acquires destination information from the connection mediation device 701 (A402), and thereafter establishes the first connection with the first external device 401 that is identified by the destination information (A403). After establishing the first connection, the communication device 101, waits for a remote control request from the control device 301 while transmitting keep-alive packets at a certain cycle.

The control device 301 also transmits a destination instruction request to the connection mediation device 701 (A404).

The decider 703 of the connection mediation device 701 detects the communication device 101 to be an object controlled by the control device 301 based on the destination instruction request. This detection may be made, if the destination instruction request contains identification information on the communication device 101 to be the control object, based on the identification information, or may be made based on a list of the combinations of the control device 301 and the communication device 101, which is held in advance. The detection may be made by a method other than the methods described here. When detecting the communication device 101 to be the control object, the decider 703 of the connection mediation device 701 acquires from the destination information storage 705 the information on the first external device 401 with which the detected communication device 101 establishes the first connection and transmits the information as destination information on the control device 301 (A405). If the communication device 101 to be the control object cannot be detected or if information on the first external device to which the communication device 101 is connected cannot be acquired, the decider 703 of the connection mediation device 701 may be configured to return error notification to the control device 301, or to instruct the control device 301 to wait for a certain amount of time and thereafter transmit again the destination instruction request. The control device 301 identifies the first external device 401 being the connection destination from the obtained destination information, transmits an establishment request of the third connection to the identified first external device 401, and receives an establishment response of the third connection from the first external device 401 to establish the third connection (A406).

A communication sequence of the remote control communication with the communication device 101 after the establishment of the third connection is similar to that in the first embodiment.

As described above, in the third embodiment, the communication device 101 and the control device 301 can dynamically acquire the information (e.g., addresses) on the first external devices 401 to be connected to as long as they know the information on the connection mediation device 701, and thus it is possible to allow the present invention to be implemented in a large-scale communicating system that is formed by a plurality of first external devices 401. In addition, in the present embodiment, the connection mediation device 701 can transmit the information on the first external device 401 to be a connection destination to the communication device 101 and transmit the measurement instructing information at the same time.

(Fourth Embodiment)

Figure 12:
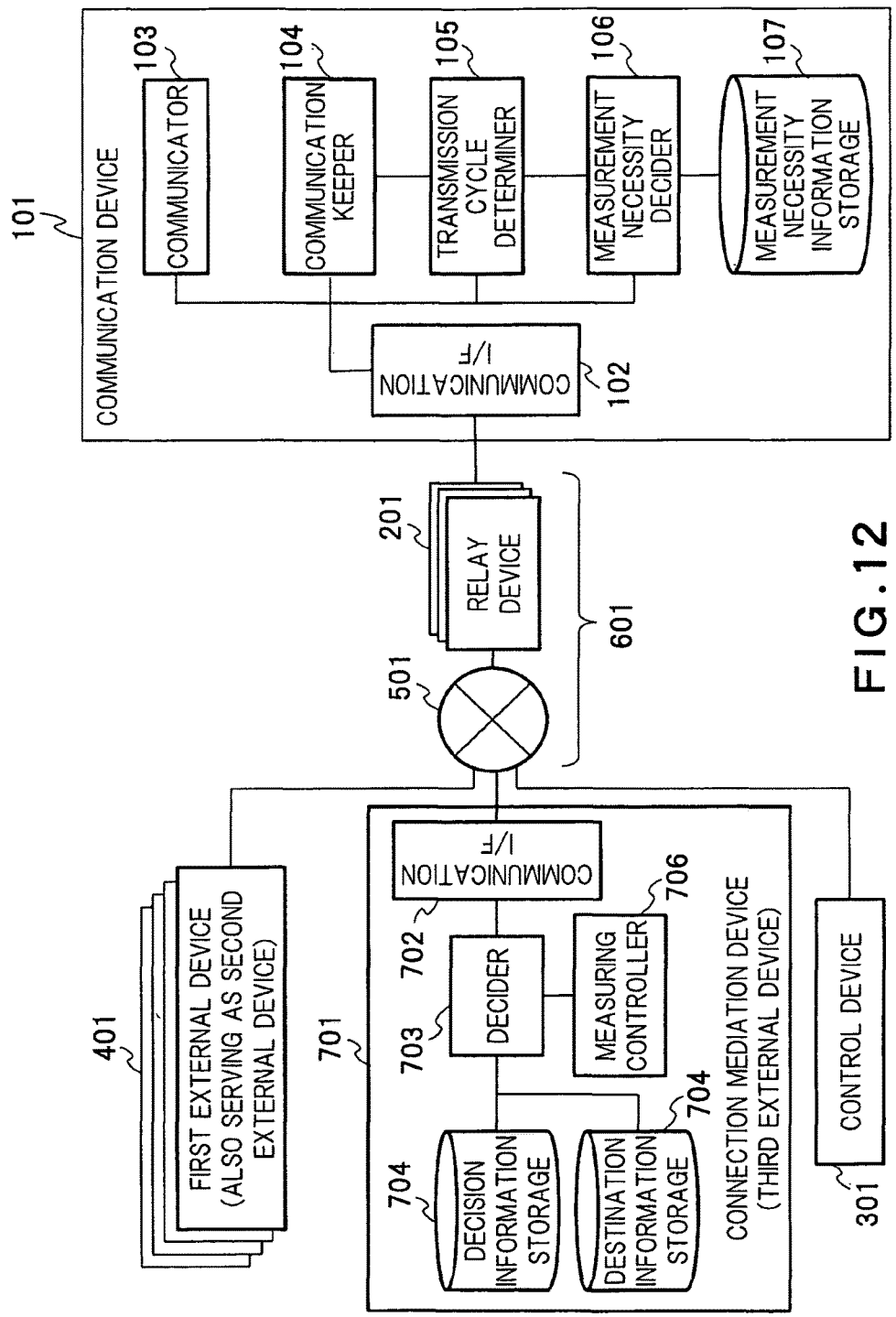
FIG. 12 is a block diagram showing the outline configuration of a communicating system in a fourth embodiment.

FIG. 12 is a block diagram showing the outline configuration of the communicating system in the fourth embodiment. As a difference from the third embodiment, the connection mediation device 701 further includes a measuring controller 706.

The measuring controller 706 causes the decider 703 to act at any timing and perform the measurement necessity decision. If the decider 703 determines to cause the communication device 101 to perform the transmission cycle measurement processing, the decider 703 transmits measurement instructing information to the communication device 101 via the first external device 401. Timings to cause the decider 703 to act may include the case where the measuring controller 706 determines that the current situation is suitable to cause the communication device 101 to perform the transmission cycle measurement processing. For example, the case where a load on the first external device 401 is light or there is no congestion in the network is included such as the case the transmission cycle measurement processing by the other communication device 101 is finished and the number of transmission cycle measurements being performed by the first external devices 401 is below a threshold value. In addition, the state or the history of the communication device 101 may be stored in the decision information storage 704, and the measuring controller 706 may refer to these pieces of information and cause the decider 703 to act at a timing at which a certain amount of time elapses from the previous measurement of the communication device 101. For the determination, information stored in the decision information storage 704 or the destination information storage 705 may be used. In addition, the decider 703 may be caused to periodically act in the nighttime when the traffic is light. In addition, the decider 703 may be caused to act in the case of receiving a notification that the transmission cycle measurement processing may be performed by the communication device 101, from the first external devices 401 or the like.

Figure 13:
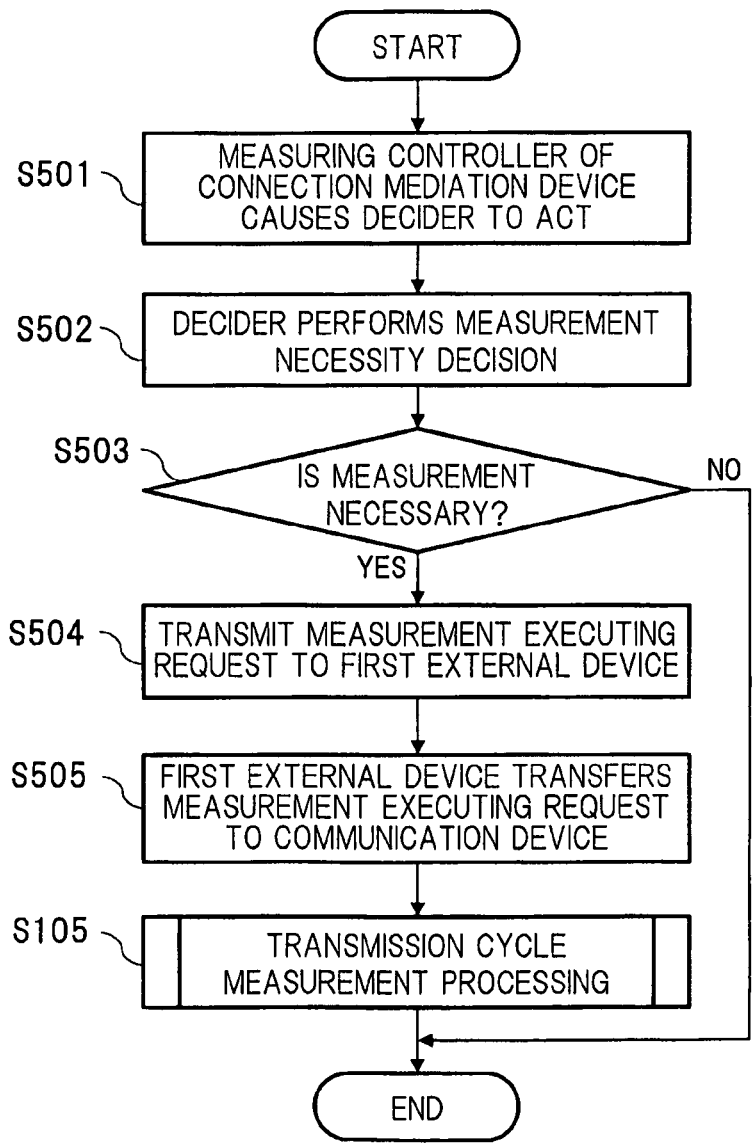
FIG. 13 shows a flow chart of transmission cycle determination processing in the fourth embodiment.

FIG. 13 shows a flow chart of transmission cycle determination processing in the fourth embodiment in the case where the measuring controller 706 causes the decider 703 to act. Before this processing, the first connection is established and kept between the communication device 101 and the first external device 401.

The measuring controller 706 causes the decider 703 to act at any timing (S501). The decider 703 performs the measurement necessity decision, as with the second or third embodiment (S502). If it is determined not to perform the transmission cycle measurement processing (NO in S503), this processing is finished. If it is determined to perform the transmission cycle measurement processing (YES in S503), the measuring controller 706 transmits an execution request of the transmission cycle measurement processing (measurement executing request) to the first external device 401 (S504). Note that the transmission of this measurement executing request may be performed by the decider 703. The first external device 401 receiving the measurement executing request transfers the measurement executing request to the communication device 101 (S505). The communication device 101 receiving the measurement executing request performs the transmission cycle measurement processing, as with the first embodiment (S105). Note that the reason why the measurement executing request is transmitted to the communication device 101 via the first external device 401 is that no connection is established between the connection mediation device 701 and the communication device 101, and a risk that a transmission triggered from on connection mediation device 701 side is prevented by the NAT or the like of the relay device 201 is taken into account. If such a risk may not need to be considered, the measurement executing request may be transmitted from the measuring controller 706 directly to the communication device 101.

Figure 14:
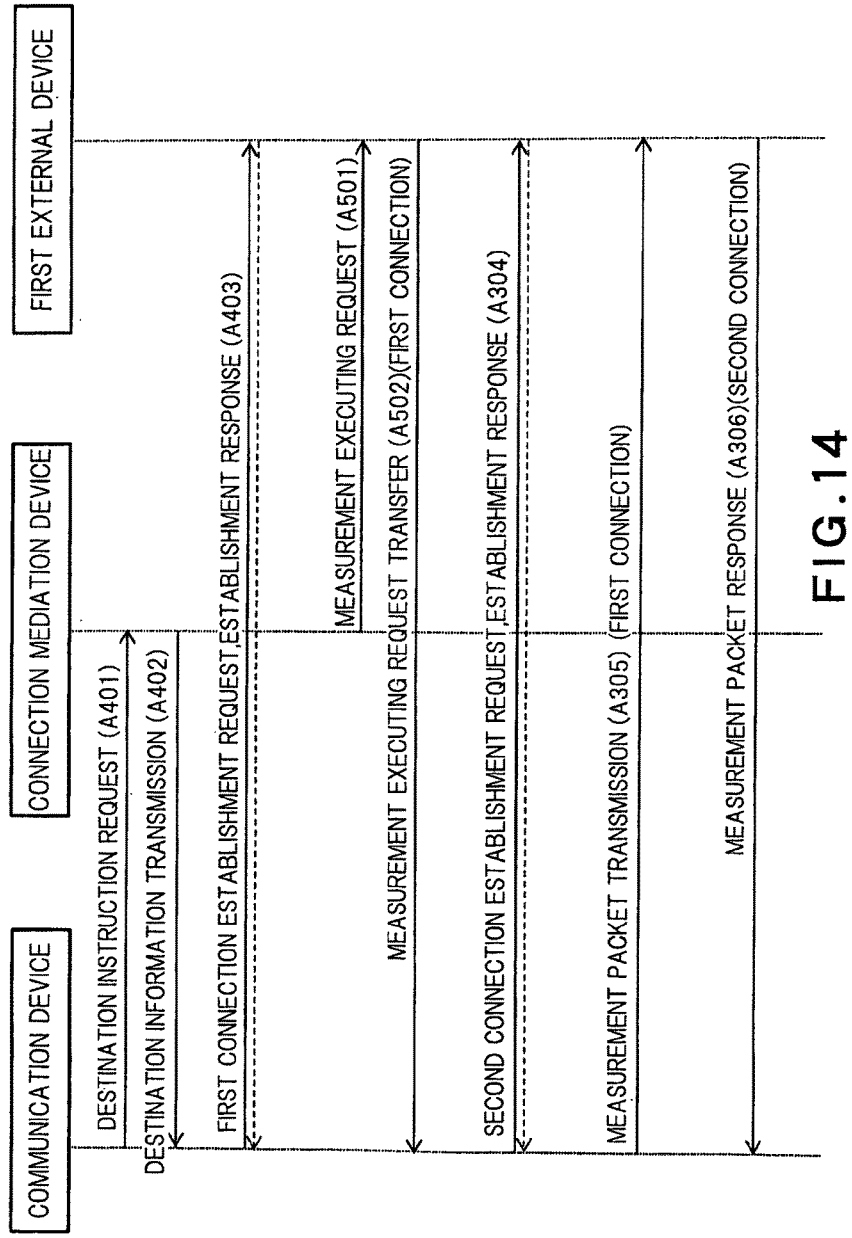
FIG. 14 is a diagram showing an example of a communication sequence in transmission cycle measurement processing in the fourth embodiment.

FIG. 14 is a diagram showing an example of the communication sequence of transmission cycle measurement processing in the fourth embodiment. The communication sequence up to the establishment of the first connection is the same as that in the third embodiment, and a measurement executing request is transmitted to the first external device 401 at a timing determined by the connection mediation device 701 (A501). The first external device 401 receiving the measurement executing request transfers the measurement executing request to the communication device 101 via the first connection (A502). Such that the first external device 401 transfers the measurement executing request, packet type information indicating the type of the measurement executing request or information on the communication device 101 (destination identifying information) may be included. In addition, a setting may be made in advance by which the measurement executing request is transferred to a destination or connection indicated by the destination identifying information when the first external device 401 receives the measurement executing request.

The communication device 101 receiving the measurement executing request transmits an establishment request of the second connection to the first external device 401 (A304). Subsequent processing is the same as that in the embodiments that have been described above.

As described above, in the fourth embodiment, the execution timing of the transmission cycle measurement processing can be determined on the connection mediation device 701 side. Therefore, in the fourth embodiment, as compared with the second or third embodiment, it is possible to efficiently control performing the measurement processing. In the present embodiment, there is no direct relationship between the destination instruction and a transmission cycle determining function, and thus a connection mediating function to perform the destination instruction and a transmission cycle determining function may be disposed in different server devices. Furthermore, as an extension of the first embodiment, the present embodiment can be applied to a configuration for which the connection mediating function is not assumed (a server device having only the transmission cycle determining function, or a server device being the first external device in which a transmission cycle determining function is installed).

Note that, each processing in the above-described embodiments can be implemented by software (a program).

Therefore, the communication devices in the above-described embodiments can be implemented by, for example, using a general-purpose computer device as basic hardware and causing a processor installed in the computer device to execute the program.

Figure 15:
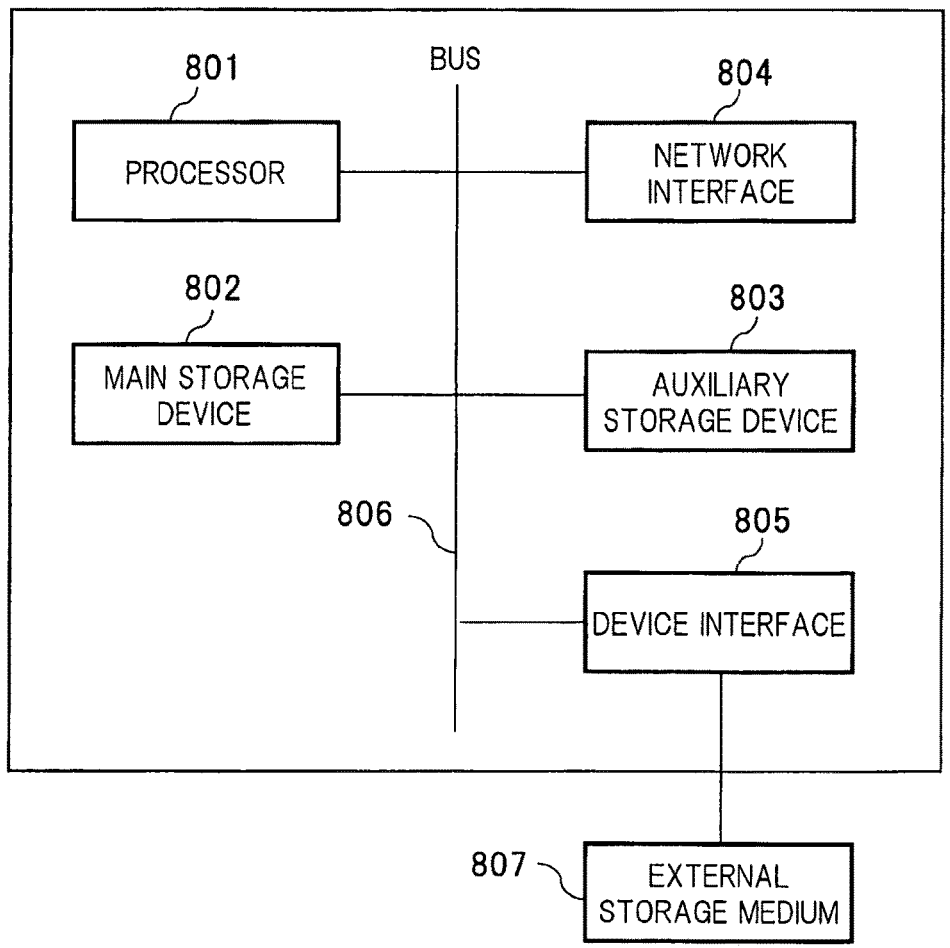
FIG. 15 is a diagram showing a configuration example of hardware including a communication device in one embodiment.

FIG. 15 shows the configuration example of hardware including the communication device 101 in one embodiment of the present invention.

The communication device 101 can be implemented as computer device including a processor 801, a main storage device 802, an auxiliary storage device 803, a network interface 804, and a device interface 805, which are connected via a bus 806.

By the processor 801 reading a program from the auxiliary storage device 803 and loading and executing the program in the main storage device 802, the functions of the communicator 103, the communication keeper 104, the transmission cycle determiner 105, and the measurement necessity decider 106 can be implemented.

The communication device 101 in the first embodiment may be implemented by installing a program to be executed on the communication device 101 in the computer device in advance, or may be implemented by installing the program to the computer device as appropriate, the program being stored in a storage medium such as a CD-ROM or being distributed over a network.

The network interface 804 is a wired or wireless interface to connect to a network. The function of the communication I/F 102 can be implemented by this network interface.

In addition, the device interface 805 is an interface to connect to a device such as an external storage medium 807. In addition, if there is an electrical apparatus such as a home appliance controlled by the control device 301 outside the communication device 101, the device interface 805 may be connected to the electrical apparatus.

The external storage medium 807 may be any recording medium such as a HDD, CD-R, CD-RW, DVD-RAM, and DVD-R.

The main storage device 802 is a memory device to temporarily store commands executed by the processor 801 and various kinds of data, and may be a volatile memory such as a DRAM or a nonvolatile memory such as an MRAM. The auxiliary storage device 803 is a storage device to permanently store a program, data, and the like, and includes, for example, an HDD, an SSD, or the like. The function of the measurement necessity information storage 107 can be implemented by the main storage device 802, the auxiliary storage device 803, or the external storage medium 807.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "storage" or "storage device" employed in the embodiments, may encompass any electronic component which can store electronic information. The "storage" or "storage device" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic such as an HDD, an optical disc or SSD.

It can be said that the storage electronically communicates with a processor if the processor read and/or write information for the storage. The storage may be integrated to a processor and also in this case, it can be said that the storage electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device comprising a computer including a processor and communication circuitry, wherein the computer is configured to
    establish a first connection with a first external device and establish a second connection with a second external device, via a communication network including at least one relay device, wherein the second external device can communicate with the first external device and wherein the communication circuitry is configured to transmit
    a keep-alive packet to the first external device via the first connection at a first transmission cycle and receive a response packet for the keep-alive packet via the first connection, the computer being further configured to:
    perform measurement processing by transmitting a measurement packet to the first external device via the first connection using the communication circuitry, the measurement packet being different from the keep-alive packet, and checking whether the measurement packet is successfully received via the second connection at the communication circuitry from the second external device which has received the measurement packet from the first external device;
    perform the measurement processing in a repetitive manner by changing a time interval at which the measurement packet is next transmitted after the measurement packet is successfully received; and
    update the first transmission cycle of the keep-alive packet based on the time interval at which the measurement packet is transmitted and based on whether the measurement packet transmitted at the time interval is successfully received, wherein
    the communication circuitry is configured to transmit the keep-alive packet to the first external device at the updated first transmission cycle.

2. The communication device according to claim 1, wherein the computer is configured:
    determine whether to perform the measurement processing based on a state or an operating history of the communication device and perform the measurement processing when the computer determines to perform the measurement processing.

3. The communication device according to claim 1, wherein the computer is configured to:

receive a measurement instructing information from a third external device via the communication circuitry, determine whether to perform the measurement processing based on the measurement instructing information, and perform the measurement processing when the computer determines to perform the measurement processing.

4. The communication device according to claim 1, wherein the first external device and the second external device are the same device.

5. The communication device according to claim 1, wherein
the communication circuitry is configured to transmit one of:
an establishment request of the first connection comprising identification information of the second connection, or
an establishment request of the second connection comprising identification information of the first connection, or
the measurement packet comprising the identification information of the second connection.

6. The communication device according to claim 1, wherein the computer is configured to update the first transmission cycle based on a maximum value of time intervals for which the measurement packet is successfully received.

7. The communication device according to claim 6, wherein, when a halt command of the measurement processing is received from one of the first external device and the second external device, or, when communication on the first or the second connection is finished, the computer is configured to finish repetition of the measurement processing.

8. The communication device according to claim 6, wherein the computer is configured to update the first transmission cycle to the maximum value of the time intervals.

9. The communication device according to claim 6, wherein the computer is configured to update the first transmission cycle each time the measurement processing is executed.

10. The communication device according to claim 1, wherein the computer is configured to change the time interval by increasing a value of the time interval at which the measurement packet is received.

11. The communication device according to claim 10, wherein, when the measurement packet is not received, or, when the time interval at which the measurement packet is next transmitted is longer than or equal to a given value, the computer is configured to finish repetition of the measurement processing.

12. The communication device according to claim 1, wherein the computer is configured to determine whether the measurement packet was received based on whether the measurement packet was received within a predetermined time from transmission of the measurement packet.

13. The communication device according to claim 1, wherein the computer is configured to transmit a query of measurement necessity to a third external device and determine that the measurement processing is required when measurement instructing information indicative of the measurement necessity is received.

14. The communication device according to claim 13, wherein the computer is configured to transmit, to the third external device, a query of an external device with which the communication device is to establish the first connection, and
the computer is configured to receive, from the third external device, information specifying the first external device as a response to the query.

15. The communication device according to claim 1, wherein, when measurement instructing information indicative of measurement necessity is received from the first external device via the first connection, the computer is configured to determine that the measurement processing is required.

16. A communication method performed by a computer including a processor, the method comprising:
establishing a first connection with a first external device and establishing a second connection with a second external device, via a communication network including at least one relay device, wherein the second external device can communicate with the first external device;
transmitting a keep-alive packet to the first external device via the first connection at a first transmission cycle and receiving a response packet for the keep-alive packet via the first connection;
performing measurement processing by transmitting a measurement packet to the first external device via the first connection, the measurement packet being different from the keep-alive packet and checking whether the measurement packet is successfully received via the second connection from the second external device which has received the measurement packet transferred by the first external device;
performing the measurement processing in a repetitive manner by changing a time interval at which the measurement packet is next transmitted after the measurement packet is successfully received;
updating the first transmission cycle of the keep-alive packet based on the time interval at which the measurement packet is transmitted and based on whether the measurement packet transmitted at the time interval is successfully received; and
transmitting the keep-alive packet to the first external device at the updated first transmission cycle.

17. A non-transitory computer readable medium having instructions stored therein which, when executed by a computer, cause the computer to perform processing comprising:
establishing a first connection with a first external device and establishing a second connection with a second external device, via a communication network including at least one relay device, wherein the second external device can communicate with the first external device;
transmitting a keep-alive packet to the first external device via the first connection at a first transmission cycle and receiving a response packet for the keep-alive packet via the first connection;
performing measurement processing by transmitting a measurement packet to the first external device via the first connection, the measurement packet being different from the keep-alive packet, and checking whether the measurement packet is successfully received via the second connection from the second external device which has received the measurement packet transferred by the first external device;
performing the measurement processing in a repetitive manner by changing a time interval at which the measurement packet is next transmitted after the measurement packet is successfully received;

updating the first transmission cycle of the keep-alive packet based on the time interval at which the measurement packet is transmitted and based on whether the measurement packet transmitted at the time interval is successfully received; and transmitting the keep-alive packet to the first external device at the updated first transmission cycle.

* * * * *